United States Patent
Barreto et al.

(10) Patent No.: US 9,396,216 B2
(45) Date of Patent: Jul. 19, 2016

(54) REPOSITORY REDUNDANCY IMPLEMENTATION OF A SYSTEM WHICH INCREMENTALLY UPDATES CLIENTS WITH EVENTS THAT OCCURRED VIA A CLOUD-ENABLED PLATFORM

(71) Applicant: Box, Inc., Los Altos, CA (US)

(72) Inventors: Tomas Barreto, Menlo Park, CA (US); David Mackenzie, Daly City, CA (US); Arshdeep Mand, Union City, CA (US); Miles Spielberg, Sunnyvale, CA (US)

(73) Assignee: BOX, INC., Redwood City, CA (US)

( * ) Notice: Subject to any disclaimer, the term of this patent is extended or adjusted under 35 U.S.C. 154(b) by 412 days.

(21) Appl. No.: 13/888,308

(22) Filed: May 6, 2013

(65) Prior Publication Data

US 2013/0304694 A1 Nov. 14, 2013

Related U.S. Application Data

(60) Provisional application No. 61/643,116, filed on May 4, 2012.

(51) Int. Cl.
*G06F 7/00* (2006.01)
*G06F 17/00* (2006.01)
(Continued)

(52) U.S. Cl.
CPC .......... *G06F 17/30283* (2013.01); *G06F 11/14* (2013.01); *G06F 11/2023* (2013.01); *G06F 11/2048* (2013.01); *G06F 11/2097* (2013.01); *G06F 17/30144* (2013.01); *G06F 17/30174* (2013.01); *G06F 11/1471* (2013.01)

(58) Field of Classification Search
None
See application file for complete search history.

(56) References Cited

U.S. PATENT DOCUMENTS

| 858,619 A | 7/1907 | O'Farrell |
| 5,043,876 A | 8/1991 | Terry |

(Continued)

FOREIGN PATENT DOCUMENTS

| CA | 2724521 | 11/2009 |
| CN | 101997924 A | 3/2011 |

(Continued)

OTHER PUBLICATIONS

"Revolving sync conflicts; frequently asked question," Microsoft Tech Support, Jul. 16, 2012, retrieved from the Internet: http://web.archive.org/web, 2 pages.

(Continued)

*Primary Examiner* — Brian P Whipple
(74) *Attorney, Agent, or Firm* — Perkins Coie LLP

(57) ABSTRACT

Techniques are disclosed for implementing repository redundancy in a system which incrementally updates remote clients with events that occurred in a cloud-enabled platform. In one embodiment, a method comprises comparing a local timestamp of an event with a remote timestamp of the event. The event is to be stored in a queue in a repository cluster to be read by a remote client. The method further comprises updating the local timestamp of the event if the comparing indicates that the remote timestamp is more recent than the local timestamp. Among other advantages, embodiments disclosed herein ensure that no event in an action log is missed or skipped by any of remote clients in a distributed action log framework system during a switchover from an active but failed server to a backup server, and require zero or minimal down time during the switchover, thereby providing robustness and serviceability to such system.

42 Claims, 13 Drawing Sheets

(51) Int. Cl.
  *G06F 17/30* (2006.01)
  *G06F 11/14* (2006.01)
  *G06F 11/20* (2006.01)

(56) References Cited

U.S. PATENT DOCUMENTS

| | | | |
|---|---|---|---|
| 5,748,735 A | 5/1998 | Ganesan | |
| 5,774,717 A | 6/1998 | Porcaro | |
| 5,787,175 A | 7/1998 | Carter | |
| 5,864,870 A | 1/1999 | Guck | |
| 6,016,467 A | 1/2000 | Newsted et al. | |
| 6,034,621 A | 3/2000 | Kaufman | |
| 6,055,543 A | 4/2000 | Christensen et al. | |
| 6,098,078 A | 8/2000 | Gehani et al. | |
| 6,226,618 B1 | 5/2001 | Downs et al. | |
| 6,233,600 B1 | 5/2001 | Salas et al. | |
| 6,260,040 B1 | 7/2001 | Kauffman et al. | |
| 6,279,109 B1 | 8/2001 | Brundridge | |
| 6,336,124 B1 | 1/2002 | Alam et al. | |
| 6,342,906 B1 | 1/2002 | Kumar et al. | |
| 6,370,543 B2 | 4/2002 | Hoffert et al. | |
| 6,374,260 B1 | 4/2002 | Hoffert et al. | |
| 6,385,606 B2 | 5/2002 | Inohara et al. | |
| 6,396,593 B1 | 5/2002 | Laverty et al. | |
| 6,441,641 B1 | 8/2002 | Pang et al. | |
| 6,446,091 B1 | 9/2002 | Noren et al. | |
| 6,449,622 B1 | 9/2002 | LaRue et al. | |
| 6,539,381 B1 | 3/2003 | Prasad et al. | |
| 6,636,897 B1 | 10/2003 | Sherman et al. | |
| 6,654,737 B1 | 11/2003 | Nunez | |
| 6,662,186 B1 | 12/2003 | Esquibel et al. | |
| 6,687,878 B1 | 2/2004 | Eintracht et al. | |
| 6,742,181 B1 | 5/2004 | Koike et al. | |
| 6,760,721 B1 | 7/2004 | Chasen et al. | |
| 6,996,768 B1 | 2/2006 | Elo et al. | |
| 7,003,667 B1 | 2/2006 | Slick et al. | |
| 7,010,752 B2 | 3/2006 | Ly | |
| 7,020,697 B1 | 3/2006 | Goodman et al. | |
| 7,080,104 B2 | 7/2006 | Ring et al. | |
| 7,130,831 B2 | 10/2006 | Howard et al. | |
| 7,143,136 B1 | 11/2006 | Drenan et al. | |
| 7,152,182 B2 | 12/2006 | Ji et al. | |
| 7,165,107 B2 | 1/2007 | Pouyoul et al. | |
| 7,171,468 B2 | 1/2007 | Yeung et al. | |
| 7,178,021 B1 | 2/2007 | Hanna et al. | |
| 7,296,025 B2 | 11/2007 | Kung et al. | |
| 7,346,778 B1 | 3/2008 | Guiter et al. | |
| 7,362,868 B2 | 4/2008 | Madoukh et al. | |
| 7,363,330 B1 | 4/2008 | Ellman et al. | |
| 7,370,269 B1 | 5/2008 | Prabhu et al. | |
| 7,380,120 B1 | 5/2008 | Garcia | |
| 7,386,535 B1 | 6/2008 | Kalucha et al. | |
| 7,647,559 B2 | 1/2010 | Yozell-Epstein et al. | |
| 7,650,367 B2 | 1/2010 | Arruza | |
| 7,653,668 B1 | 1/2010 | Shelat et al. | |
| 7,661,088 B2 | 2/2010 | Burke | |
| 7,734,600 B1 | 6/2010 | Wise et al. | |
| 7,739,411 B2 | 6/2010 | Messer et al. | |
| 7,756,843 B1 | 7/2010 | Palmer | |
| 7,774,412 B1 | 8/2010 | Schnepel | |
| 7,886,287 B1 | 2/2011 | Davda | |
| 7,886,295 B2 | 2/2011 | Burger et al. | |
| 7,890,964 B2 | 2/2011 | Vogler-Ivashchanka et al. | |
| 7,937,663 B2 | 5/2011 | Parker et al. | |
| 7,958,353 B2 | 6/2011 | Matsuzaki et al. | |
| 7,958,453 B1 | 6/2011 | Taing | |
| 7,979,296 B2 | 7/2011 | Kruse et al. | |
| 7,996,374 B1 | 8/2011 | Jones et al. | |
| 8,027,976 B1 | 9/2011 | Ding et al. | |
| RE42,904 E | 11/2011 | Stephens, Jr. | |
| 8,065,739 B1 | 11/2011 | Bruening et al. | |
| 8,090,361 B2 | 1/2012 | Hagan | |
| 8,103,662 B2 | 1/2012 | Eagan et al. | |
| 8,151,183 B2 | 4/2012 | Chen et al. | |
| 8,185,830 B2 | 5/2012 | Saha et al. | |
| 8,200,582 B1 | 6/2012 | Zhu | |
| 8,201,230 B2 | 6/2012 | Day et al. | |
| 8,214,747 B1 | 7/2012 | Yankovich et al. | |
| 8,230,348 B2 | 7/2012 | Peters et al. | |
| 8,239,918 B1 | 8/2012 | Cohen | |
| 8,326,814 B2 | 12/2012 | Ghods et al. | |
| 8,358,701 B2 | 1/2013 | Chou et al. | |
| 8,370,803 B1 | 2/2013 | Holler et al. | |
| 8,429,540 B1 | 4/2013 | Yankovich et al. | |
| 8,447,820 B1 | 5/2013 | Gay | |
| 8,464,161 B2 | 6/2013 | Giles et al. | |
| 8,473,775 B1 * | 6/2013 | Helmick | G06F 11/00 707/623 |
| 8,515,902 B2 | 8/2013 | Savage | |
| 8,527,549 B2 | 9/2013 | Cidon | |
| 8,549,066 B1 | 10/2013 | Donahue et al. | |
| 8,549,511 B2 | 10/2013 | Seki et al. | |
| 8,582,777 B2 | 11/2013 | Urivskiy et al. | |
| 8,583,619 B2 | 11/2013 | Ghods et al. | |
| 8,607,306 B1 | 12/2013 | Bridge et al. | |
| 8,650,498 B1 | 2/2014 | Mihovilovic | |
| 8,719,445 B2 | 5/2014 | Ko | |
| 8,719,810 B2 | 5/2014 | Oh | |
| 8,745,267 B2 | 6/2014 | Luecke et al. | |
| 8,782,637 B2 | 7/2014 | Khalid | |
| 8,825,597 B1 | 9/2014 | Houston et al. | |
| 8,849,955 B2 | 9/2014 | Prahlad et al. | |
| 8,868,574 B2 | 10/2014 | Kiang et al. | |
| 8,892,679 B1 | 11/2014 | Destagnol et al. | |
| 8,914,856 B1 | 12/2014 | Velummylum et al. | |
| 8,914,900 B2 | 12/2014 | Smith et al. | |
| 8,918,387 B1 | 12/2014 | Sokolov | |
| 8,949,939 B2 | 2/2015 | Peddada | |
| 8,959,579 B2 | 2/2015 | Barton et al. | |
| 8,966,062 B1 | 2/2015 | Giese et al. | |
| 8,990,307 B2 | 3/2015 | Barreto et al. | |
| 8,990,955 B2 | 3/2015 | Hymel et al. | |
| 9,015,248 B2 | 4/2015 | Barreto et al. | |
| 9,054,919 B2 | 6/2015 | Kiang et al. | |
| 2002/0029218 A1 | 3/2002 | Bentley et al. | |
| 2002/0091738 A1 | 7/2002 | Rohrabaugh et al. | |
| 2002/0116544 A1 | 8/2002 | Barnard et al. | |
| 2002/0194177 A1 | 12/2002 | Sherman et al. | |
| 2003/0041095 A1 | 2/2003 | Konda et al. | |
| 2003/0084306 A1 | 5/2003 | Abburi et al. | |
| 2003/0115326 A1 | 6/2003 | Verma et al. | |
| 2003/0217171 A1 | 11/2003 | Von Stuermer et al. | |
| 2003/0228015 A1 | 12/2003 | Futa et al. | |
| 2004/0003104 A1 * | 1/2004 | Boskovic | H04L 29/06 709/231 |
| 2004/0076187 A1 * | 4/2004 | Peled | H04L 12/2852 370/514 |
| 2004/0098361 A1 | 5/2004 | Peng | |
| 2004/0103147 A1 | 5/2004 | Flesher et al. | |
| 2004/0117438 A1 | 6/2004 | Considine et al. | |
| 2004/0122949 A1 | 6/2004 | Zmudzinski et al. | |
| 2004/0162836 A1 * | 8/2004 | Aronoff | H04L 29/06 |
| 2004/0177138 A1 | 9/2004 | Salle et al. | |
| 2004/0196307 A1 | 10/2004 | Zak et al. | |
| 2004/0201604 A1 | 10/2004 | Kraenzel et al. | |
| 2004/0218214 A1 | 11/2004 | Kihara et al. | |
| 2004/0230624 A1 | 11/2004 | Frolund et al. | |
| 2004/0230652 A1 | 11/2004 | Estrada et al. | |
| 2004/0260977 A1 * | 12/2004 | Ji | G06F 11/2069 714/36 |
| 2004/0267836 A1 | 12/2004 | Armangau et al. | |
| 2005/0010860 A1 | 1/2005 | Weiss et al. | |
| 2005/0022175 A1 | 1/2005 | Sliger et al. | |
| 2005/0022229 A1 | 1/2005 | Gabriel et al. | |
| 2005/0028006 A1 | 2/2005 | Leser et al. | |
| 2005/0033777 A1 | 2/2005 | Moraes et al. | |
| 2005/0038997 A1 | 2/2005 | Kojima et al. | |
| 2005/0055306 A1 | 3/2005 | Miller et al. | |
| 2005/0097225 A1 | 5/2005 | Glatt et al. | |
| 2005/0097434 A1 | 5/2005 | Storisteanu | |
| 2005/0102328 A1 | 5/2005 | Ring et al. | |
| 2005/0108406 A1 | 5/2005 | Lee et al. | |
| 2005/0114305 A1 | 5/2005 | Haynes et al. | |
| 2005/0138118 A1 | 6/2005 | Banatwala et al. | |

(56) References Cited

U.S. PATENT DOCUMENTS

| | | |
|---|---|---|
| 2005/0172284 A1 | 8/2005 | Dandekar et al. |
| 2005/0182966 A1 | 8/2005 | Pham et al. |
| 2005/0198452 A1 | 9/2005 | Watanabe |
| 2005/0234864 A1 | 10/2005 | Shapiro |
| 2005/0234943 A1 | 10/2005 | Clarke |
| 2005/0261933 A1 | 11/2005 | Magnuson |
| 2006/0005163 A1 | 1/2006 | Huesken et al. |
| 2006/0026502 A1 | 2/2006 | Dutta |
| 2006/0026535 A1 | 2/2006 | Hotelling et al. |
| 2006/0036568 A1 | 2/2006 | Moore et al. |
| 2006/0041752 A1 | 2/2006 | Tuvell et al. |
| 2006/0047804 A1 | 3/2006 | Fredricksen et al. |
| 2006/0053380 A1 | 3/2006 | Spataro et al. |
| 2006/0075071 A1 | 4/2006 | Gillette |
| 2006/0117247 A1 | 6/2006 | Fite et al. |
| 2006/0133340 A1 | 6/2006 | Rybak et al. |
| 2006/0173952 A1* | 8/2006 | Coyle ............... H04J 3/0667 709/203 |
| 2006/0179309 A1 | 8/2006 | Cross et al. |
| 2006/0242204 A1 | 10/2006 | Karas et al. |
| 2006/0242206 A1 | 10/2006 | Brezak et al. |
| 2006/0288043 A1 | 12/2006 | Novak et al. |
| 2007/0028291 A1 | 2/2007 | Brennan et al. |
| 2007/0038934 A1 | 2/2007 | Fellman |
| 2007/0067349 A1 | 3/2007 | Jhaveri et al. |
| 2007/0079242 A1 | 4/2007 | Jolley et al. |
| 2007/0100830 A1 | 5/2007 | Beedubail et al. |
| 2007/0115845 A1 | 5/2007 | Hochwarth et al. |
| 2007/0118598 A1 | 5/2007 | Bedi et al. |
| 2007/0124460 A1 | 5/2007 | McMullen et al. |
| 2007/0124737 A1 | 5/2007 | Wensley et al. |
| 2007/0124781 A1 | 5/2007 | Casey et al. |
| 2007/0130143 A1 | 6/2007 | Zhang et al. |
| 2007/0130163 A1 | 6/2007 | Perez et al. |
| 2007/0162610 A1 | 7/2007 | Un et al. |
| 2007/0179993 A1* | 8/2007 | Arruza ............... G06F 11/1612 |
| 2007/0198609 A1 | 8/2007 | Black et al. |
| 2007/0208878 A1 | 9/2007 | Barnes-Leon et al. |
| 2007/0220016 A1 | 9/2007 | Estrada et al. |
| 2007/0220590 A1 | 9/2007 | Rasmussen et al. |
| 2007/0240057 A1 | 10/2007 | Satterfield et al. |
| 2007/0250762 A1 | 10/2007 | Mansfield |
| 2007/0256065 A1 | 11/2007 | Heishi et al. |
| 2007/0266304 A1 | 11/2007 | Fletcher et al. |
| 2007/0282848 A1 | 12/2007 | Kiilerich et al. |
| 2008/0005135 A1 | 1/2008 | Muthukrishnan et al. |
| 2008/0016146 A1 | 1/2008 | Gan et al. |
| 2008/0021959 A1 | 1/2008 | Naghi et al. |
| 2008/0040503 A1 | 2/2008 | Kleks et al. |
| 2008/0040560 A1 | 2/2008 | Hall et al. |
| 2008/0046828 A1 | 2/2008 | Bibliowicz et al. |
| 2008/0063210 A1 | 3/2008 | Goodman et al. |
| 2008/0065881 A1 | 3/2008 | Dawson et al. |
| 2008/0091763 A1 | 4/2008 | Devonshire et al. |
| 2008/0091790 A1 | 4/2008 | Beck |
| 2008/0114720 A1 | 5/2008 | Smith et al. |
| 2008/0140732 A1 | 6/2008 | Wilson et al. |
| 2008/0154873 A1 | 6/2008 | Redlich et al. |
| 2008/0182628 A1 | 7/2008 | Lee et al. |
| 2008/0183467 A1 | 7/2008 | Yuan et al. |
| 2008/0184130 A1 | 7/2008 | Tien et al. |
| 2008/0194239 A1 | 8/2008 | Hagan |
| 2008/0195673 A1 | 8/2008 | Hamel et al. |
| 2008/0215883 A1 | 9/2008 | Fok et al. |
| 2008/0243855 A1 | 10/2008 | Prahlad et al. |
| 2008/0250348 A1 | 10/2008 | Alimpich et al. |
| 2008/0263099 A1 | 10/2008 | Brady-Kalnay et al. |
| 2008/0271095 A1 | 10/2008 | Shafton |
| 2008/0276158 A1 | 11/2008 | Lim et al. |
| 2008/0281972 A1 | 11/2008 | Gupta et al. |
| 2008/0294899 A1 | 11/2008 | Gazzetta et al. |
| 2009/0015864 A1 | 1/2009 | Hasegawa |
| 2009/0030710 A1 | 1/2009 | Levine |
| 2009/0043848 A1 | 2/2009 | Kordun |
| 2009/0044128 A1 | 2/2009 | Baumgarten et al. |
| 2009/0049131 A1 | 2/2009 | Lyle et al. |
| 2009/0119322 A1 | 5/2009 | Mills et al. |
| 2009/0125469 A1 | 5/2009 | McDonald et al. |
| 2009/0150627 A1 | 6/2009 | Benhase et al. |
| 2009/0158142 A1 | 6/2009 | Arthursson et al. |
| 2009/0171983 A1 | 7/2009 | Samji et al. |
| 2009/0172201 A1 | 7/2009 | Carmel |
| 2009/0177754 A1 | 7/2009 | Brezina et al. |
| 2009/0193107 A1 | 7/2009 | Srinivasan et al. |
| 2009/0193345 A1 | 7/2009 | Wensley et al. |
| 2009/0214115 A1 | 8/2009 | Kimura et al. |
| 2009/0235181 A1 | 9/2009 | Saliba et al. |
| 2009/0235189 A1 | 9/2009 | Aybes et al. |
| 2009/0260060 A1 | 10/2009 | Smith et al. |
| 2009/0265430 A1 | 10/2009 | Bechtel et al. |
| 2009/0271708 A1 | 10/2009 | Peters et al. |
| 2009/0276771 A1 | 11/2009 | Nickolov et al. |
| 2009/0282212 A1 | 11/2009 | Peterson |
| 2009/0282483 A1 | 11/2009 | Bennett |
| 2009/0300356 A1 | 12/2009 | Crandell |
| 2009/0327358 A1 | 12/2009 | Lukiyanov et al. |
| 2009/0327405 A1 | 12/2009 | FitzGerald et al. |
| 2009/0327961 A1 | 12/2009 | De Vorchik et al. |
| 2010/0011292 A1 | 1/2010 | Marinkovich et al. |
| 2010/0011447 A1 | 1/2010 | Jothimani |
| 2010/0017262 A1 | 1/2010 | Iyer et al. |
| 2010/0017619 A1 | 1/2010 | Errico |
| 2010/0042720 A1 | 2/2010 | Stienhans et al. |
| 2010/0057560 A1 | 3/2010 | Skudlark et al. |
| 2010/0082534 A1 | 4/2010 | Sagar et al. |
| 2010/0082634 A1 | 4/2010 | Leban |
| 2010/0083136 A1 | 4/2010 | Komine et al. |
| 2010/0088150 A1 | 4/2010 | Mazhar et al. |
| 2010/0092126 A1 | 4/2010 | Kaliszek et al. |
| 2010/0107225 A1 | 4/2010 | Spencer et al. |
| 2010/0122184 A1 | 5/2010 | Vonog et al. |
| 2010/0131868 A1 | 5/2010 | Chawla et al. |
| 2010/0153835 A1 | 6/2010 | Xiong et al. |
| 2010/0162365 A1 | 6/2010 | Del Real |
| 2010/0162374 A1 | 6/2010 | Nair |
| 2010/0179940 A1 | 7/2010 | Gilder et al. |
| 2010/0185932 A1 | 7/2010 | Coffman et al. |
| 2010/0191689 A1 | 7/2010 | Cortes et al. |
| 2010/0198944 A1 | 8/2010 | Ho et al. |
| 2010/0205392 A1 | 8/2010 | Schnapp et al. |
| 2010/0212010 A1 | 8/2010 | Stringer et al. |
| 2010/0218237 A1 | 8/2010 | Ferris et al. |
| 2010/0235539 A1 | 9/2010 | Carter et al. |
| 2010/0241611 A1 | 9/2010 | Zuber |
| 2010/0242028 A1 | 9/2010 | Weigert |
| 2010/0250120 A1 | 9/2010 | Waupotitsch et al. |
| 2010/0251340 A1 | 9/2010 | Martin et al. |
| 2010/0257457 A1 | 10/2010 | De Goes |
| 2010/0262582 A1 | 10/2010 | Garcia-Ascanio et al. |
| 2010/0281118 A1 | 11/2010 | Donahue et al. |
| 2010/0290623 A1 | 11/2010 | Banks et al. |
| 2010/0306379 A1 | 12/2010 | Ferris |
| 2010/0312615 A1 | 12/2010 | Murphy et al. |
| 2010/0325155 A1 | 12/2010 | Skinner et al. |
| 2010/0325527 A1 | 12/2010 | Estrada et al. |
| 2010/0325559 A1 | 12/2010 | Westerinen et al. |
| 2010/0325655 A1 | 12/2010 | Perez |
| 2010/0332401 A1 | 12/2010 | Prahlad et al. |
| 2010/0332962 A1 | 12/2010 | Hammer et al. |
| 2010/0333116 A1 | 12/2010 | Prahlad et al. |
| 2010/1318893 | 12/2010 | Matthews et al. |
| 2011/0001763 A1 | 1/2011 | Murakami |
| 2011/0016409 A1 | 1/2011 | Grosz et al. |
| 2011/0022559 A1 | 1/2011 | Andersen et al. |
| 2011/0022812 A1 | 1/2011 | van der Linden et al. |
| 2011/0029883 A1 | 2/2011 | Lussier et al. |
| 2011/0040812 A1 | 2/2011 | Phillips |
| 2011/0041083 A1 | 2/2011 | Gabai et al. |
| 2011/0047484 A1 | 2/2011 | Mount et al. |
| 2011/0052155 A1 | 3/2011 | Desmarais et al. |
| 2011/0065082 A1 | 3/2011 | Gal et al. |
| 2011/0078243 A1 | 3/2011 | Carpenter et al. |
| 2011/0083167 A1 | 4/2011 | Carpenter et al. |
| 2011/0093567 A1 | 4/2011 | Jeon et al. |

(56) References Cited

U.S. PATENT DOCUMENTS

| | | |
|---|---|---|
| 2011/0099006 A1 | 4/2011 | Sundararaman et al. |
| 2011/0107088 A1 | 5/2011 | Eng et al. |
| 2011/0107205 A1 | 5/2011 | Chow et al. |
| 2011/0113320 A1 | 5/2011 | Neff et al. |
| 2011/0119313 A1 | 5/2011 | Sung et al. |
| 2011/0125847 A1 | 5/2011 | Cocheu et al. |
| 2011/0131299 A1 | 6/2011 | Sardary |
| 2011/0137991 A1 | 6/2011 | Russell |
| 2011/0142410 A1 | 6/2011 | Ishii |
| 2011/0145187 A1 | 6/2011 | Himmelsbach et al. |
| 2011/0145282 A1 | 6/2011 | Moore et al. |
| 2011/0145589 A1 | 6/2011 | Camenisch et al. |
| 2011/0145744 A1 | 6/2011 | Haynes et al. |
| 2011/0154180 A1 | 6/2011 | Evanitsky et al. |
| 2011/0167435 A1 | 7/2011 | Fang |
| 2011/0185292 A1 | 7/2011 | Chawla et al. |
| 2011/0202424 A1 | 8/2011 | Chun et al. |
| 2011/0202599 A1 | 8/2011 | Yuan et al. |
| 2011/0208958 A1 | 8/2011 | Stuedi et al. |
| 2011/0209064 A1 | 8/2011 | Jorgensen et al. |
| 2011/0213765 A1 | 9/2011 | Cui et al. |
| 2011/0219419 A1 | 9/2011 | Reisman |
| 2011/0225417 A1 | 9/2011 | Maharajh et al. |
| 2011/0238621 A1 | 9/2011 | Agrawal |
| 2011/0238759 A1 | 9/2011 | Spataro et al. |
| 2011/0246294 A1 | 10/2011 | Robb et al. |
| 2011/0252071 A1 | 10/2011 | Cidon |
| 2011/0252312 A1 | 10/2011 | Lemonik et al. |
| 2011/0252320 A1 | 10/2011 | Arrasvuori et al. |
| 2011/0252339 A1 | 10/2011 | Lemonik et al. |
| 2011/0258461 A1 | 10/2011 | Bates |
| 2011/0277027 A1 | 11/2011 | Hayton et al. |
| 2011/0282710 A1 | 11/2011 | Akkiraju et al. |
| 2011/0289433 A1 | 11/2011 | Whalin et al. |
| 2011/0296022 A1 | 12/2011 | Ferris et al. |
| 2011/0314145 A1 | 12/2011 | Raleigh et al. |
| 2011/0320197 A1 | 12/2011 | Conejero et al. |
| 2011/0320936 A1 | 12/2011 | Mohan et al. |
| 2012/0036370 A1 | 2/2012 | Lim et al. |
| 2012/0057696 A1 | 3/2012 | Chew |
| 2012/0064879 A1 | 3/2012 | Panei |
| 2012/0072436 A1 | 3/2012 | Pierre et al. |
| 2012/0089610 A1 | 4/2012 | Agrawal et al. |
| 2012/0089659 A1 | 4/2012 | Halevi et al. |
| 2012/0089710 A1 | 4/2012 | Rakowski et al. |
| 2012/0096521 A1 | 4/2012 | Peddada |
| 2012/0101995 A1* | 4/2012 | Agetsuma ............ G06F 3/0605 707/644 |
| 2012/0110005 A1 | 5/2012 | Kuo et al. |
| 2012/0110436 A1 | 5/2012 | Adler, III et al. |
| 2012/0110443 A1 | 5/2012 | Lemonik et al. |
| 2012/0117626 A1 | 5/2012 | Yates et al. |
| 2012/0124306 A1 | 5/2012 | Abercrombie et al. |
| 2012/0124547 A1 | 5/2012 | Halbedel |
| 2012/0130900 A1 | 5/2012 | Tang et al. |
| 2012/0134491 A1 | 5/2012 | Liu |
| 2012/0136936 A1 | 5/2012 | Quintuna |
| 2012/0143825 A1 | 6/2012 | Boehm et al. |
| 2012/0144283 A1 | 6/2012 | Hill et al. |
| 2012/0151265 A1* | 6/2012 | Bender ................ G06F 11/366 714/37 |
| 2012/0151551 A1 | 6/2012 | Readshaw et al. |
| 2012/0159178 A1 | 6/2012 | Lin et al. |
| 2012/0159310 A1 | 6/2012 | Chang et al. |
| 2012/0166516 A1 | 6/2012 | Simmons et al. |
| 2012/0173612 A1 | 7/2012 | Vegesna-Venkata et al. |
| 2012/0173625 A1 | 7/2012 | Berger |
| 2012/0179802 A1 | 7/2012 | Narasimhan et al. |
| 2012/0179981 A1 | 7/2012 | Whalin et al. |
| 2012/0185355 A1 | 7/2012 | Kilroy |
| 2012/0185913 A1 | 7/2012 | Martinez et al. |
| 2012/0192086 A1 | 7/2012 | Ghods et al. |
| 2012/0203670 A1 | 8/2012 | Piersol |
| 2012/0203908 A1 | 8/2012 | Beaty et al. |
| 2012/0204032 A1 | 8/2012 | Wilkins et al. |
| 2012/0214444 A1 | 8/2012 | McBride et al. |
| 2012/0218885 A1 | 8/2012 | Abel et al. |
| 2012/0221789 A1 | 8/2012 | Felter |
| 2012/0224691 A1 | 9/2012 | Purohit |
| 2012/0233155 A1 | 9/2012 | Gallmeier et al. |
| 2012/0233543 A1 | 9/2012 | Vagell et al. |
| 2012/0240183 A1 | 9/2012 | Sinha |
| 2012/0257249 A1 | 10/2012 | Natarajan |
| 2012/0263166 A1 | 10/2012 | Cho et al. |
| 2012/0266203 A1 | 10/2012 | Elhadad et al. |
| 2012/0284664 A1 | 11/2012 | Zhao |
| 2012/0291011 A1 | 11/2012 | Quine |
| 2012/0296790 A1 | 11/2012 | Robb |
| 2012/0311157 A1 | 12/2012 | Erickson et al. |
| 2012/0317239 A1 | 12/2012 | Mulder et al. |
| 2012/0317487 A1 | 12/2012 | Lieb et al. |
| 2012/0328259 A1 | 12/2012 | Seibert, Jr. et al. |
| 2012/0331177 A1 | 12/2012 | Jensen |
| 2012/0331441 A1 | 12/2012 | Adamson |
| 2013/0007245 A1 | 1/2013 | Malik et al. |
| 2013/0007471 A1 | 1/2013 | Grab et al. |
| 2013/0007894 A1 | 1/2013 | Dang et al. |
| 2013/0013560 A1 | 1/2013 | Goldberg et al. |
| 2013/0014023 A1 | 1/2013 | Lee et al. |
| 2013/0042106 A1 | 2/2013 | Persaud et al. |
| 2013/0054634 A1* | 2/2013 | Chakraborty ...... G06F 17/30206 707/769 |
| 2013/0055127 A1 | 2/2013 | Saito et al. |
| 2013/0067232 A1 | 3/2013 | Cheung et al. |
| 2013/0073403 A1 | 3/2013 | Tuchman et al. |
| 2013/0073621 A1 | 3/2013 | Waddoups et al. |
| 2013/0080765 A1 | 3/2013 | Mohanty et al. |
| 2013/0080919 A1 | 3/2013 | Kiang et al. |
| 2013/0110565 A1 | 5/2013 | Means, Jr. et al. |
| 2013/0117337 A1 | 5/2013 | Dunham |
| 2013/0117376 A1 | 5/2013 | Filman et al. |
| 2013/0124638 A1 | 5/2013 | Barreto et al. |
| 2013/0124984 A1 | 5/2013 | Kuspa |
| 2013/0138608 A1 | 5/2013 | Smith |
| 2013/0138615 A1 | 5/2013 | Gupta et al. |
| 2013/0151690 A1 | 6/2013 | Shah et al. |
| 2013/0159411 A1 | 6/2013 | Bowen |
| 2013/0163289 A1 | 6/2013 | Kim et al. |
| 2013/0167253 A1 | 6/2013 | Seleznev et al. |
| 2013/0185347 A1 | 7/2013 | Romano |
| 2013/0185558 A1 | 7/2013 | Seibert et al. |
| 2013/0191339 A1 | 7/2013 | Haden et al. |
| 2013/0198600 A1 | 8/2013 | Lockhart et al. |
| 2013/0212067 A1 | 8/2013 | Piasecki et al. |
| 2013/0212486 A1 | 8/2013 | Joshi et al. |
| 2013/0218978 A1 | 8/2013 | Weinstein et al. |
| 2013/0226876 A1 | 8/2013 | Gati et al. |
| 2013/0227522 A1 | 8/2013 | Lerum et al. |
| 2013/0239049 A1 | 9/2013 | Perrodin et al. |
| 2013/0246901 A1 | 9/2013 | Massand |
| 2013/0246932 A1 | 9/2013 | Zaveri et al. |
| 2013/0254699 A1 | 9/2013 | Bashir et al. |
| 2013/0262210 A1 | 10/2013 | Savage et al. |
| 2013/0262862 A1 | 10/2013 | Hartley |
| 2013/0268480 A1 | 10/2013 | Dorman |
| 2013/0268491 A1 | 10/2013 | Chung et al. |
| 2013/0275398 A1 | 10/2013 | Dorman et al. |
| 2013/0275429 A1 | 10/2013 | York et al. |
| 2013/0275509 A1 | 10/2013 | Micucci et al. |
| 2013/0282830 A1 | 10/2013 | Besen et al. |
| 2013/0305039 A1 | 11/2013 | Gauda |
| 2013/0326344 A1 | 12/2013 | Masselle et al. |
| 2014/0006357 A1 | 1/2014 | Davis et al. |
| 2014/0006465 A1 | 1/2014 | Davis et al. |
| 2014/0007205 A1 | 1/2014 | Oikonomou |
| 2014/0013112 A1 | 1/2014 | Cidon et al. |
| 2014/0019497 A1 | 1/2014 | Cidon et al. |
| 2014/0019498 A1 | 1/2014 | Cidon et al. |
| 2014/0032489 A1 | 1/2014 | Hebbar et al. |
| 2014/0032616 A1 | 1/2014 | Nack |
| 2014/0033277 A1 | 1/2014 | Xiao et al. |
| 2014/0033291 A1 | 1/2014 | Liu |
| 2014/0033324 A1 | 1/2014 | Kiang et al. |
| 2014/0040182 A1 | 2/2014 | Gilder et al. |

(56) References Cited

U.S. PATENT DOCUMENTS

| | | | |
|---|---|---|---|
| 2014/0047509 A1 | 2/2014 | Bhogal et al. |
| 2014/0052939 A1 | 2/2014 | Tseng et al. |
| 2014/0059002 A1 | 2/2014 | Lockhart et al. |
| 2014/0059217 A1 | 2/2014 | Pizurica |
| 2014/0068589 A1 | 3/2014 | Barak |
| 2014/0074629 A1 | 3/2014 | Rathod |
| 2014/0082071 A1 | 3/2014 | Rexer |
| 2014/0150023 A1 | 5/2014 | Gudorf et al. |
| 2014/0156373 A1 | 6/2014 | Roberts et al. |
| 2014/0172595 A1 | 6/2014 | Beddow et al. |
| 2014/0172783 A1 | 6/2014 | Suzuki et al. |
| 2014/0172799 A1 | 6/2014 | Dorman |
| 2014/0188798 A1 | 7/2014 | Mackenzie et al. |
| 2014/0195485 A1 | 7/2014 | Dorman |
| 2014/0201138 A1 | 7/2014 | Dorman et al. |
| 2014/0201145 A1 | 7/2014 | Dorman et al. |
| 2014/0244600 A1 | 8/2014 | Schmidt et al. |
| 2014/0280605 A1 | 9/2014 | Zhang |
| 2014/0337291 A1 | 11/2014 | Dorman et al. |
| 2014/0337491 A1 | 11/2014 | Barreto et al. |
| 2014/0359286 A1 | 12/2014 | Wen et al. |
| 2014/0372376 A1 | 12/2014 | Smith et al. |
| 2014/0379647 A1 | 12/2014 | Smith et al. |
| 2015/0019723 A1 | 1/2015 | Kweon et al. |
| 2015/0039556 A1 | 2/2015 | Mackenzie et al. |
| 2015/0186668 A1 | 7/2015 | Whaley et al. |
| 2015/0237406 A1* | 8/2015 | Ochoa ............... H04N 21/4828 725/53 |
| 2015/0339113 A1 | 11/2015 | Dorman et al. |
| 2016/0065672 A1 | 3/2016 | Savage et al. |

FOREIGN PATENT DOCUMENTS

| | | |
|---|---|---|
| CN | 102264063 A | 11/2011 |
| EP | 0348614 A2 | 1/1990 |
| EP | 0921661 A2 | 6/1999 |
| EP | 1349088 | 10/2003 |
| EP | 1528746 A2 | 5/2005 |
| EP | 1933242 A1 | 6/2008 |
| EP | 2372574 A1 | 10/2011 |
| EP | 2610776 A2 | 7/2013 |
| GB | 2453924 A | 4/2009 |
| GB | 2471282 A | 12/2010 |
| GB | 1316532.9 | 3/2016 |
| JP | 09-101937 | 4/1997 |
| JP | 2003273912 A | 9/2003 |
| JP | 2004310272 A | 11/2004 |
| WO | WO-0007104 A1 | 2/2000 |
| WO | WO-0219128 A1 | 3/2002 |
| WO | WO-2007113573 A2 | 10/2007 |
| WO | WO-2008011142 A2 | 1/2008 |
| WO | WO-2008076520 A2 | 6/2008 |
| WO | WO-2011109416 A2 | 9/2011 |
| WO | WO-2013009328 A2 | 1/2013 |
| WO | WO-2013013217 A1 | 1/2013 |
| WO | WO-2013041763 A1 | 3/2013 |
| WO | WO-2013166520 | 11/2013 |

OTHER PUBLICATIONS

"Troubleshoot sync problems," Microsoft Tech Support: May 2, 2012, retrieved from the internet, http://web.Archive.org/web, 3 pages.
"Tulsa TechFest 2012—Agenda," retrieved from the website, http://web.archive.org, Oct. 2, 2012, 2 pages.
Cohen, "Debating the Definition of Cloud Computing Platforms," retrieved from the internet, http://forbes.com, Feb. 3, 2014, 7 pages.
Delendik, "Evolving with Web Standards—The Story of PDF JS," retrieved from the internet, http://people.mozilla.org, Oct. 12, 2012, 36 pages.
Delendik, "My PDF.js talk slides from Tulsa TechFest," retrieved from the internet, http://twitter.com, Oct. 12, 2012, 2 pages.
Duffy, "The Best File-Syncing Services," pcmag.com, retrieved from the internet: http://www.pcmag.com, Sep. 28, 2012, 7 pages.
Exam Report for EP13177108.1, Applicant: Box, Inc. Mailed May 26, 2014, 6 pages.
Exam Report for GB1318792.7, Applicant: Box, Inc. Mailed May 22, 2014, 2 pages.
Partial Search Report for EP131832800, Applicant: Box, Inc. Mailed May 8, 2014, 5 pages.
Pyle et al., "How to enable Event logging for Offline Files (Client Side Caching) in Windows Vista," Feb. 18, 2009, retrieved from the internet: http://blogs.technet.com, 3 pages.
Rao, "Box Acquires Crocodoc to Add HTML5 Document Converter and Sleek Content Viewing Experience to Cloud Storage Platform," retrieved from the internet, http://techcrunch.com, May 9, 2013, 8 pages.
Search Report for EP13187217.8, Applicant: Box, Inc. Mailed Apr. 15, 2014, 12 pages.
Search Report for EP141509422, Applicant: Box, Inc. Mailed May 8, 2014, 7 pages.
Sommerer, "Presentable Document Format: Improved On-demand PDF to HTML Conversion," retrieved from the internet, http://research.microsoft.com, Nov. 2004, 8 pages.
Tulloch et al., "Windows Vista Resource Kit," Apr. 8, 2007, Microsoft Press, XP055113067, 6 pages.
Walker, "PDF.js project meeting notes," retrieved from the internet, http://groups.google.com, May 15, 2014, 1 page.
International Search Report and Written Opinion for PCT/US2013/034662, Applicant: Box, Inc., Mailed May 31, 2013, 10 pages.
Exam Report for GB1306011.6, Applicant: Box, Inc. Mailed Apr. 18, 2013, 8 pages.
Exam Report for GB1300188.8, Applicant: Box, Inc. Mailed May 31, 2013, 8 pages.
"Conceptboard", One-Step Solution for Online Collaboration, retrieved from websites http://conceptboard.com and https://www.youtube.com/user/ConceptboardApp?feature=watch, printed on Jun. 13, 2013, 9 pages.
Exam Report for EP13158415.3, Applicant: Box, Inc. Mailed Jun. 4, 2013, 8 pages.
International Search Report and Written Opinion for PCT/US2013/029520, Applicant: Box, Inc., Mailed Jun. 26, 2013, 10 pages.
International Search Report and Written Opinion for PCT/US2013/023889, Applicant: Box, Inc., Mailed Jun. 24, 2013, 13 pages.
International Search Report and Written Opinion for PCT/US2013/035404, Applicant: Box, Inc., Mailed Jun. 26, 2013, 13 pages.
Exam Report for GB1410569.6 Applicant: Box, Inc. Mailed Jul. 11, 2014, 9 pages.
"Average Conversion Time for a D60 RAW file?" http://www.dpreview.com, Jul. 22, 2002, 4 pages.
Burns, "Developing Secure Mobile Applications for Android," Oct. 2008, Version 1.0, 1-28 pages.
Comes, "MediaXchange User's Manual," Version 1.15.15, Feb. 1, 2009, pp. 1-90.
Exam Report for GB1308842.2, Applicant: Box, Inc. Mailed Mar. 10, 2014, 4 pages.
Exam Report for GB1312264.3, Applicant: Box, Inc. Mailed Mar. 24, 2014, 7 pages.
Exam Report for GB1314771.5, Applicant: Box, Inc. Mailed Feb. 17, 2014, 7 pages.
John et al., "Always Sync Support Forums—View topic—Allway sync funny behavior," Allway Sync Support Forum at http://sync-center.com, Mar. 28, 2011, XP055109680, 2 pages.
Search Report for EP 11729851.3, Applicant: Box, Inc. Mailed Feb. 7, 2014, 9 pages.
Search Report for EP14151588.2, Applicant: Box, Inc. Mailed Apr. 15, 2014, 12 pages.
Search Report for EP14153783.7, Applicant: Box, Inc. Mailed Mar. 24, 2014, 7 pages.
Extended Search Report for EP131832800, Applicant: Box, Inc. Mailed Aug. 25, 2014, 7 pages.
Extended Search Report for EP141509422, Applicant: Box, Inc. Mailed Aug. 26, 2014, 12pages.
Search Report for EP 13189144.2 Applicant: Box, Inc. Mailed Sep. 1, 2014, 9 pages.
Exam Report for GB1312874.9 Applicant: Box, Inc. Mailed Sep. 26, 2014, 2 pages.

(56) References Cited

OTHER PUBLICATIONS

Exam Report for GB1415126.0 Applicant: Box, Inc. Mailed Oct. 2, 2014, 8 pages.
Exam Report for GB1415314.2 Applicant: Box, Inc. Mailed Oct. 7, 2014, 6 pages.
Exam Report for GB1309209.3 Applicant: Box, Inc. Mailed Oct. 7, 2014, 3 pages.
Exam Report for GB1315232.7 Applicant: Box, Inc. Mailed Oct. 9, 2014, 5 pages.
Exam Report for GB1318789.3 Applicant: Box, Inc. Mailed Oct. 30, 2014, 6 pages.
Microsoft Windows XP Professional Product Documentation: How Inheritance Affects File and Folder Permissions, Apr. 11, 2014, 2 pages.
Exam Report for GB1317393.5 Applicant: Box, Inc. Mailed Nov. 7, 2014, 6 pages.
Exam Report for GB1311417.8 Applicant: Box, Inc. Mailed Nov. 7, 2014, 2 pages.
Exam Report for GB1311421.0 Applicant: Box, Inc. Mailed Nov. 7, 2014, 4 pages.
Exam Report for GB1316682.2 Applicant: Box, Inc. Mailed Nov. 19, 2014, 6 pages.
Exam Report for GB1312095.1 Applicant: Box, Inc. Mailed Nov. 19, 2014, 5 pages.
Exam Report for GB1313559.5 Applicant: Box, Inc. Mailed Nov. 4, 2014, 2 pages.
"PaperPort Professional 14," PC Mag. Com review, published Feb. 2012, Ziff Davis, Inc., 8 pages.
"PaperPort," Wikipedia article (old revision), published May 19, 2012, Wikipedia Foundation, 2 pages.
"Quickoffice Enhances Android Mobile office Application for Improved Productivity on latest Smartphone and Table Devices," QuickOffice Press Release, Nov. 21, 2011, QuickOffice Inc., 2 pages.
"QuickOffice," Wikipedia Article (old revision), published May 9, 2012, Wikipedia Foundation, 2 pages.
Exam Report for EP13168784.0, Applicant: Box, Inc. Mailed Nov. 21, 2013, 7 pages.
Exam Report for GB1309209.3, Applicant: Box, Inc. Mailed Oct. 30, 2013, 11 pages.
Exam Report for GB1310666.1, Applicant: Box, Inc. Mailed Aug. 30, 2013, 10 pages.
Exam Report for GB1311417.8, Applicant: Box, Inc. Mailed Dec. 20, 2013, 5 pages.
Exam Report for GB1312095.1, Applicant: Box, Inc. Mailed Dec. 12, 2013, 7 pages.
Exam Report for GB1312874.9, Applicant: Box, Inc. Mailed Dec. 20, 2013, 11 pages.
Exam Report for GB1313559.5, Applicant: Box, Inc., Mailed Aug. 22, 2013, 19 pages.
Exam Report for GB1316532.9, Applicant: Box, Inc. Mailed Oct. 31, 2013, 10 pages.
Exam Report for GB1316533.7, Applicant: Box, Inc. Mailed Oct. 8, 2013, 9 pages.
Exam Report for GB1316971.9, Applicant: Box, Inc. Mailed Nov. 26, 2013, 10 pages.
Exam Report for GB1317600.3, Applicant: Box, Inc. Mailed Nov. 21, 2013, 8 pages.
Exam Report for GB1318373.6, Applicant: Box, Inc. Mailed Dec. 17, 2013, 4 pages.
Exam Report for GB1320902.8, Applicant: Box, Inc. Mailed Dec. 20, 2013, 4 pages.
Gedymin, "Cloud computing with an emphasis on Google App Engine," Master Final Project, Sep. 2011, 146 pages.
Google Docs, http://web.Archive.org/web/20100413105758/http://en.wikipedia.org/wiki/Google_docs, Apr. 13, 2010, 6 pages.
International Search Report and Written Opinion for PCT/US2013/034765, Applicant: Box, Inc., Mailed Jan. 20, 2014, 15 pages.
International Search Report and Written Opinion for PCT/US2013/039782, Applicant: Box, Inc., Mailed Aug. 28, 2013, 15 pages.
Patent Court Document of Approved Judgment for GB0602349.3 and GB0623571.7; Mar. 3, 2009, 17 pages.
Exam Report for EP13185269.1, Applicant: Box, Inc. Mailed Jan. 28, 7 pages.
User's Guide for SMART Board Software for Windows, published Dec. 2004, 90 pages.
Zambonini et al., "Automated Measuring of Interaction with User Interfaces," Published as WO2007113573 Oct. 2007, 19 pages.
Exam Report for GB1309209.3 Applicant: Box, Inc. Mailed Jan. 19, 2015, 6 pages.
"Agilewords—How to Request Approval," YouTube, http://www.youtube.com/watch?v=3-Ov3DYNN3Q, Jan. 31, 2011, 2 pages.
"Agilewords—Features, Powerful Features Yet Simple," Jun. 1, 2011, http://web.archive.org/web/20110601223756/http://agilewords.com/product/features, 3 pages.
Conner, "Google Apps: The Missing Manual," published by O'Reilly Media, May 27, 2008, 42 pages.
Exam Report for EP 13177108.1, Applicant: Box, Inc. Mailed Feb. 17, 2015, 6 pages.
Exam Report for GB1312264.3 Applicant: Box, Inc. Mailed Jan. 30, 2015, 5 pages.
Exam Report for GB1312874.9 Applicant: Box, Inc. Mailed Feb. 10, 2015, 7 pages.
Exam Report for GB1316685.5 Applicant: Box, Inc. Mailed Feb. 17, 2015, 5 pages.
Exam Report for EP 13185269.1, Applicant: Box, Inc. Mailed Feb. 13, 2015, 8 pages.
Exam Report for GB1311459.0 Applicant: Box, Inc. Mailed Aug. 19, 2013, 6 pages.
"Dropbox: Sync only specific folders," posted on Feb. 9, 2012, available online at http://www.tech-recipes.com/rx/20865/dropbox-sync-only-specific-folders/, 4 pages.
Invens, "Using and Troubleshooting Offline Files," Jun. 23, 2002, Windows IT Pro, pp. 1-5.
Invens, "Using and Troubleshooting Offline Files," Jun. 23, 2002, Windows IT Pro, Figures 1 and 2, 2 pages.
"How-to Geek, How to Sync Specific Folders With Dropbox," originally written on Jun. 20, 2010 and archived version retrieved from WaybackMachine as published online on Jun. 4, 2010 at http://www.howtogeek.com/howto/18285/sync-specific-folders-with-dropbox, 7 pages.
Exam Report for GB1316532.9 Applicant: Box, Inc. Mailed Mar. 27, 2015, 6 pages.
Burney, "How to Move Document from Your Computer to Your iPad and Back Again," May 31, 2011, 3 pages.
Exam Report for GB1413461.3; Applicant: Box, Inc. Mailed Aug. 21, 2015, 6 pages.
Fu et al., "Efficient and Fine-Grained Sharing of Encrypted Files," Quality of Service (IWQos), 2010 18th International Workshop on year 2010, pp. 1-2.
Exam Report for GB1220644.7 Applicant: Box, Inc. Mailed May 1, 2015, 4 pages.
Ivens, "Using and Troubleshooting Offline Files," Jun. 23, 2002, Windows IT Pro, Figure 1.
Ivens, "Configuring Offline Files," Apr. 21, 2002, Windows IT Pro, pp. 1-5.
Exam Report for GB1316532.9; Applicant: Box, Inc., Mailed on Mar. 8, 2016, 3 pages.
U.S. Appl. No. 61/505,999, filed Jul. 11, 2011, Desktop Application for Access and Interaction with Workspaces in a Cloud-Based Content Management System and Synchronization Mechanisms Thereof.
U.S. Appl. No. 13/282,427, filed Oct. 26, 2011, Desktop Application for Access and Interaction with Workspaces in a Cloud-Based Content Management System and Synchronization Mechanisms Thereof.
U.S. Appl. No. 61/564,425, filed Nov. 29, 2011, Mobile Platform Folder Synchronization and Offline Synchronization.
U.S. Appl. No. 61/568,430, filed Dec. 8, 2011, Mobile Platform File and Folder Selection Functionalities for Offline Access and Synchronization.

(56) References Cited

OTHER PUBLICATIONS

U.S. Appl. No. 13/689,544, filed Nov. 29, 2012, Mobile Platform File and Folder Selection Functionalities For Offline Access and Synchronization.
U.S. Appl. No. 61/560,685, filed Nov. 16, 2011, Temporal and Spatial Processing and Tracking of Evenets in a Web-Based Collaboration Environment For Asynchronous Delivery in an Ordered Fashion.
U.S. Appl. No. 13/524,501, filed Jun. 15, 2012, Resource Effective Incremental Updating of a Remote Client With Events Which Occurred Via a Cloud-Enabled Platform.
U.S. Appl. No. 13/526,437, filed Jun. 18, 2012, Managing Updates at Clients Used by a User to Access a Cloud-Based Collaboration Service.
U.S. Appl. No. 14/658,423, filed Mar. 16, 2015, Managing Updates at Clients Used by a User to Access a Cloud-Based Collaboration Service.
U.S. Appl. No. 61/620,554, filed Apr. 5, 2012, Device Pinning Capability For Enterprise Cloud Service and Storage Accounts.
U.S. Appl. No. 13/493,922, filed Jun. 11, 2012, Device Pinning Capability For Enterprise Cloud Service and Storage Accounts.
U.S. Appl. No. 61/622,868, filed Apr. 11, 2012, Wed and Desktop Client Synchronization of Mac Packages With a Cloud-Based Platform.
U.S. Appl. No. 13/618,993, filed Sep. 14, 2012, Cloud Service Enable To Handle a Set of Files Depicted to a User As a Single File in a Native Operating System.
U.S. Appl. No. 61/643,116, filed May 4, 2012, Hbase Redundancy Implementation For Action Log Framework.
U.S. Appl. No. 13/890,172, filed May 8, 2013, Repository Redundancy Implementation of a System Which Incrementally Updates Clients With Events That Occurred Via a Cloud-Based Platform.
U.S. Appl. No. 61/693,521, filed Aug. 27, 2012, Backend Implementation of Synchronization Client Selective Subfolder Syncing in a Cloud-Based Environment.
U.S. Appl. No. 14/010,851, filed Aug. 27, 2013, Server Side Techniques For Reducing Database Workload in Implementing Selective Subfolder Synchronization in a Cloud-Based Environment.
U.S. Appl. No. 61/751,578, filed Jan. 11, 2013, Functionalities, Features, and User Interface of a Synchronization Client to a Cloud-Based Environment.
U.S. Appl. No. 14/153,726, filed Jan. 13, 2014, Functionalities, Features, and User Interface of a Synchronization Client to a Cloud-Based Environment.
U.S. Appl. No. 61/750,474, filed Jan. 9, 2013, File System Event Monitor and Event Filter Pipeline for a Cloud-Based Platform.
U.S. Appl. No. 14/149,586, filed Jan. 7, 2014, File System Monitoring in a System Which Incrementally Updates Clients With Events That Occurred in a Cloud-Based Collaboration Platform.
U.S. Appl. No. 61/753,761, Conflict Resolution, Retry Condition Management, and Handling of Problem Files For the Synchronization Client to a Cloud-Based Platform.
U.S. Appl. No. 14/158,626, Conflict Resolution, Retry Condition Management, and Handling of Problem Files For the Synchronization Client to a Cloud-Based Platform.
U.S. Appl. No. 61/739,296, filed Dec. 19, 2012, Synchronization of Read-Only Files/Folders by a Synchronization Client With a Cloud-Based Platform.
U.S. Appl. No. 14/135,311, filed Dec. 19, 2013, Method and Apparatus For Synchronization of Items With Read-Only Permissions in a Cloud-Based Environment.
U.S. Appl. No. 61/748,399, Jan. 2, 2013, Handling Action Log Framework Race Conditions for a Synchronization Client to a Cloud-Based Environment.
U.S. Appl. No. 14/146,658, filed Jan. 2, 2014, Race Condition Handling in a System Which Incrementally Updates Clients With Events That Occurred in a Cloud-Based Collaboration Platform.
U.S. Appl. No. 61/822,170, filed May 10, 2013, Identification and Handling of Items to Be Ignored for Synchronization With a Cloud-Based Platform by a Synchronization Client.
U.S. Appl. No. Identification and Handling of Items to Be Ignored for Synchronization With a Cloud-Based Platform by a Synchronization Client.
U.S. Appl. No. 61/822,191, filed May 10, 2013, Systems and Methods For Depicting Item Synchronization With a Cloud-Based Platform By a Synchronization Client.
U.S. Appl. No. 14/275,401, filed May 12, 2014, Top Down Delete or Unsynchronization on Delete of and Depiction of Item Synchronization With a Synchronization Client to a Cloud-Based Platform.
U.S. Appl. No. 61/834,756, filed Jun. 13, 2013, Systems and Methods For Event Building, Collapsing, or Monitoring by a Synchronization Client of a Cloud-Based Platform.
U.S. Appl. No. 14/304,038, filed Jun. 13, 2014, Systems and Methods For Synchronization Event Building and/or Collapsing by a Synchronization Component of a Cloud-Based Platform.
U.S. Appl. No. 61/838,176, filed Jun. 21, 2013, Maintaining and Updating File System Shadows on a Local Device by a Synchronization Client of a Cloud-Based Platform.
U.S. Appl. No. 14/312,482, filed Jun. 23, 2014, Maintaining and Updating File System Shadows on a Local Device by a Synchronization Client of a Cloud-Based Platform.
U.S. Appl. No. 61/860,050, filed Jul. 30, 2013, Scalability Improvement in a System Which Incrementally Updates Clients With Events That Occurred in a Cloud-Based Collaboration Platform.
U.S. Appl. No. 14/194,091, filed Feb. 28, 2014, Scalability Improvement in a System Which Incrementally Updates Clients With Events That Occurred in a Cloud-Based Collaboration Platform.

* cited by examiner

REPOSITORY REDUNDANCY IMPLEMENTATION OF A SYSTEM WHICH INCREMENTALLY UPDATES CLIENTS WITH EVENTS THAT OCCURRED VIA A CLOUD-ENABLED PLATFORM

CROSS-REFERENCE TO RELATED APPLICATIONS AND EFFECTIVE FILING DATE ENTITLEMENT

This application is entitled to the benefit of and/or the right of priority to U.S. Provisional Application No. 61/643,116, entitled "HBASE REDUNDANCY IMPLEMENTATION FOR ACTION LOG FRAMEWORK", filed May 4, 2012, which is hereby incorporated by reference in its entirety. This application is therefore entitled to an effective filing date of May 4, 2012.

This application is related to U.S. patent application Ser. No. 13/524,501, entitled "RESOURCE EFFECTIVE INCREMENTAL UPDATING OF A REMOTE CLIENT WITH EVENTS WHICH OCCURRED VIA A CLOUD-ENABLED PLATFORM", filed Jun. 15, 2012, which is hereby incorporated by reference in its entirety.

This application is related to U.S. patent application Ser. No. 13/526,437, entitled "MANAGING UPDATES AT CLIENTS USED BY A USER TO ACCESS A CLOUD-BASED COLLABORATION SERVICE", filed Jun. 18, 2012, which is hereby incorporated by reference in its entirety.

BACKGROUND

The use of electronic and digital content has greatly increased in enterprise settings or other organizations as the preferred mechanism for project, task, and work flow management, as has the need for streamlined collaboration and sharing of digital content and documents. In such an environment, multiple users share, access and otherwise perform actions or tasks on content and files in a shared workspace, where any number of users may have access to a given file or may want to or need to perform an action on the file at any given time.

The cloud-based nature of such an environment enables users/collaborators to access, view, edit content anytime, from any device, or using any number of and/or types of clients, simultaneously while other collaborators in the same group, enterprise, or other types of organizations may also be accessing, viewing, or editing the same file or content or content in the same work group. Among others, the different types of clients and the number of devices which can be used to access a single account or work item or cloud content in the cloud-based environment create problems of maintaining consistency and correct ordering in how changes are reflected at the clients that are used by users/collaborators. The timing of spontaneous reads, writes, and/or other accesses attempted by different clients together with the timing of switching datacenters when unpredicted failures take place further complicates the problem.

BRIEF DESCRIPTION OF DRAWINGS

The present embodiments are illustrated by way of example and are not intended to be limited by the figures of the accompanying drawings. In the drawings.

The same reference numbers and any acronyms identify elements or acts with the same or similar structure or functionality throughout the drawings and specification for ease of understanding and convenience.

DETAILED DESCRIPTION

Figure 1:
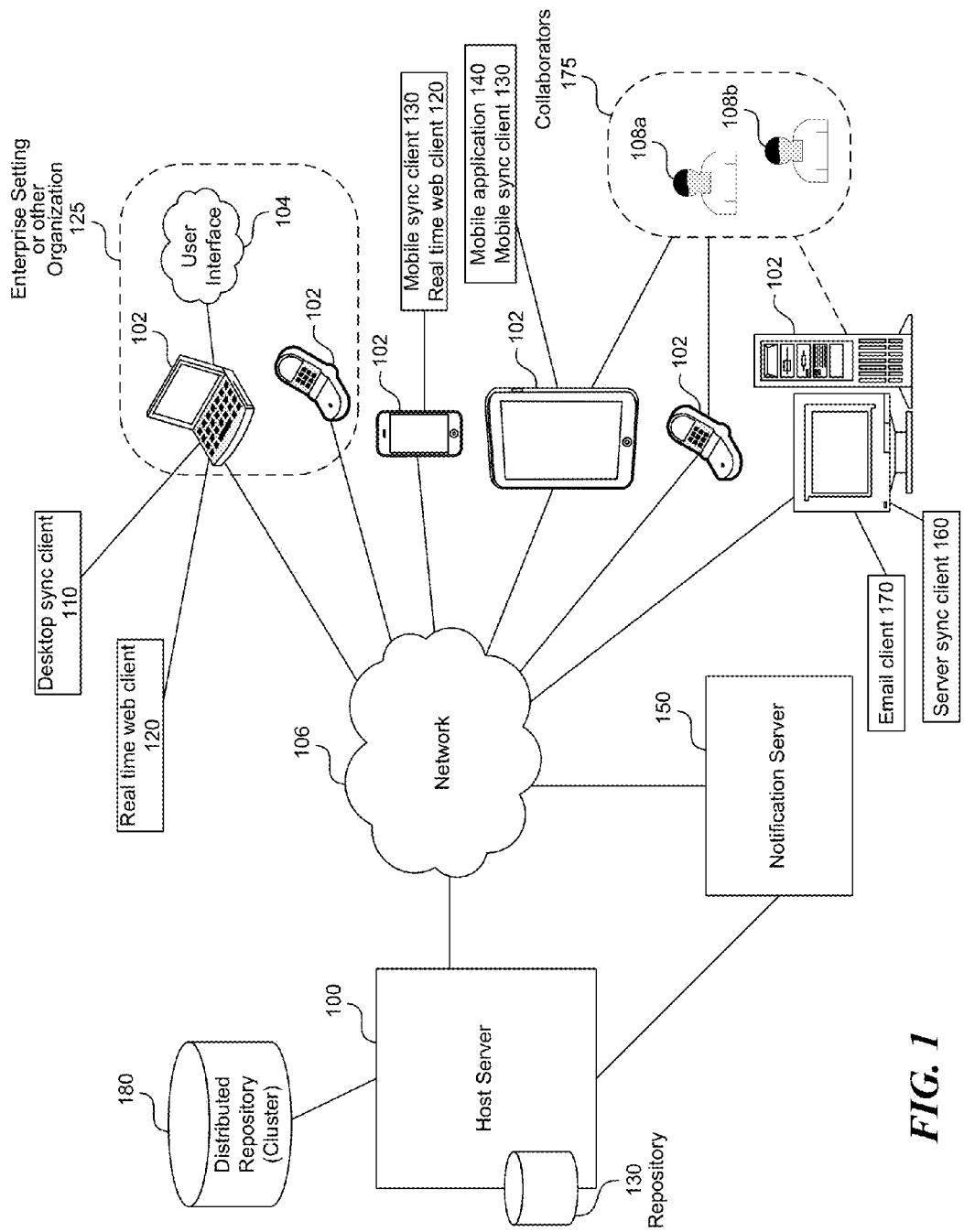
FIG. 1 depicts an example diagram of a system having repository redundancy capabilities in a host server of a cloud-based service, collaboration and/or cloud storage platform that incrementally updates remote clients at devices with events that occurred via the platform.

Techniques are disclosed for implementing repository redundancy in a system which incrementally updates remote clients with events that occurred in a cloud-enabled platform. In one embodiment, a method comprises comparing a local timestamp of an event with a remote timestamp of the event. The event is to be stored in a queue in a repository cluster to be read by a remote client. The method further comprises updating the local timestamp of the event if the comparing indicates that the remote timestamp is more recent than the local timestamp. In some embodiments, a method comprises generating a second event in the action log. The second event can include a second local timestamp that is updated based on a current time of the system. Further, the second event can have a same identifier as the first event. Among other advantages, embodiments disclosed herein ensure that no event in an action log is missed or skipped by any of remote clients in a distributed action log framework system during a switchover or a failover from an active server to a backup server upon failure, and require zero or minimal down time during the switchover or failover, thereby providing robustness and serviceability to such system.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others. Similarly, various requirements are described which can be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms can be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms can be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

FIG. 1 illustrates an example diagram of a system having repository redundancy capabilities in a host server 100 of a cloud-based service, collaboration and/or cloud storage platform that incrementally updates remote clients (e.g., clients 110, 120, 130, 140, 160, 170) at devices 102 with events that occurred via the platform hosted by the server 100.

The client devices 102 can be any system and/or device, and/or any combination of devices/systems that is able to establish a communication or a connection, including wired, wireless, cellular connections with another device, a server and/or other systems such as host server 100 and/or a notification server 150. Client devices 102 typically include a display and/or other output functionalities to present information and data exchanged between among the devices 102, the notification server 150, and/or the host server 100.

For example, the client devices 102 can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a PDA, a smart phone (e.g., a BlackBerry device such as BlackBerry Z10/Q10, an iPhone, Nexus 4, etc.), a Treo, a handheld tablet (e.g. an iPad, iPad Mini, a Galaxy Note, Galaxy Note II, Xoom Tablet, Microsoft Surface, Blackberry PlayBook, Nexus 7, 10 etc.), a phablet (e.g., HTC Droid DNA, etc.), a tablet PC, a thin-client, a hand held console, a hand held gaming device or console (e.g., XBOX live, Nintendo DS, Sony PlayStation Portable, etc.), mobile-enabled powered watch (e.g., iOS, Android or other platform based), Google Glass, a Chromebook and/or any other portable, mobile, hand held devices, etc. running on any platform or any operating system (e.g., Mac-based OS (OS X, iOS, etc.), Windows-based OS (Windows Mobile, Windows 7, Windows 8, etc.), Android, Blackberry OS, Embedded Linux platforms, Palm OS, Symbian platform, Google Chrome OS, and the like. In one embodiment, the client devices 102, host server 100, and/or the notification server 150 (e.g., a server hosting application 120) are coupled via a network 106. In some embodiments, the devices 102 and host server 100 and/or notification server 150 may be directly connected to one another.

The input mechanism on client devices 102 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Signals received or detected indicating user activity at client devices 102 through one or more of the above input mechanism, or others, can be used by various users or collaborators (e.g., collaborators 108) for accessing, through network 106, a web-based collaboration environment or online collaboration platform (e.g., hosted by the host server 100). The collaboration environment or platform can have one or more collective settings 125 for an enterprise or an organization that the users belong, and can provide an user interface 104 for the users to access such platform under the settings 125.

The collaboration platform or environment hosts workspaces with work items that one or more users can access (e.g., view, edit, update, revise, comment, download, preview, tag, or otherwise manipulate, etc.). A work item can generally include any type of digital or electronic content that can be viewed or accessed via an electronic device (e.g., device 102). The digital content can include .pdf files, .doc, slides (e.g., Powerpoint slides), images, audio files, multimedia content, web pages, blogs, etc. A workspace can generally refer to any grouping of a set of digital content in the collaboration platform. The grouping can be created, identified, or specified by a user or through other means. This user may be a creator user or administrative user, for example.

In general, a workspace can be associated with a set of users or collaborators (e.g., collaborators 108) which have access to the content included therein. The levels of access (e.g., based on permissions or rules) of each user or collaborator to access the content in a given workspace may be the same or may vary among the users. Each user may have their own set of access rights to every piece of content in the workspace, or each user may be different access rights to different pieces of content. Access rights may be specified by a user associated with a workspace and/or a user who created/uploaded a particular piece of content to the workspace, or any other designated user or collaborator.

In general, the collaboration platform allows multiple users or collaborators to access or collaborate efforts on work items such each user can see, remotely, edits, revisions, comments, or annotations being made to specific work items through their own user devices. For example, a user can upload a document to a workspace for other users to access (e.g., for viewing, editing, commenting, signing-off, or otherwise manipulating). The user can login to the online platform and upload the document (or any other type of work item) to an existing workspace or to a new workspace. The document can be shared with existing users or collaborators in a workspace.

In general, network 106, over which the client devices 102 and the host server 100 communicate may be a cellular network, a telephonic network, an open network, such as the Internet, or a private network, such as an intranet and/or the extranet, or any combination or variation thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102 and the host server 100 and may appear as one or more networks to the serviced systems and devices. In one embodiment, communications to and from the client devices 102 can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), or any broadband network, and further enabled with technologies such as, by way of example, Global System for Mobile Communications (GSM), Personal Communications Service (PCS), Bluetooth, WiFi, Fixed Wireless Data, 2G, 2.5G, 3G (e.g., WCDMA/UMTS based 3G networks), 4G, IMT-Advanced, pre-4G, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, HSPA+, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks, broadband networks, or messaging protocols.

Figure 2:
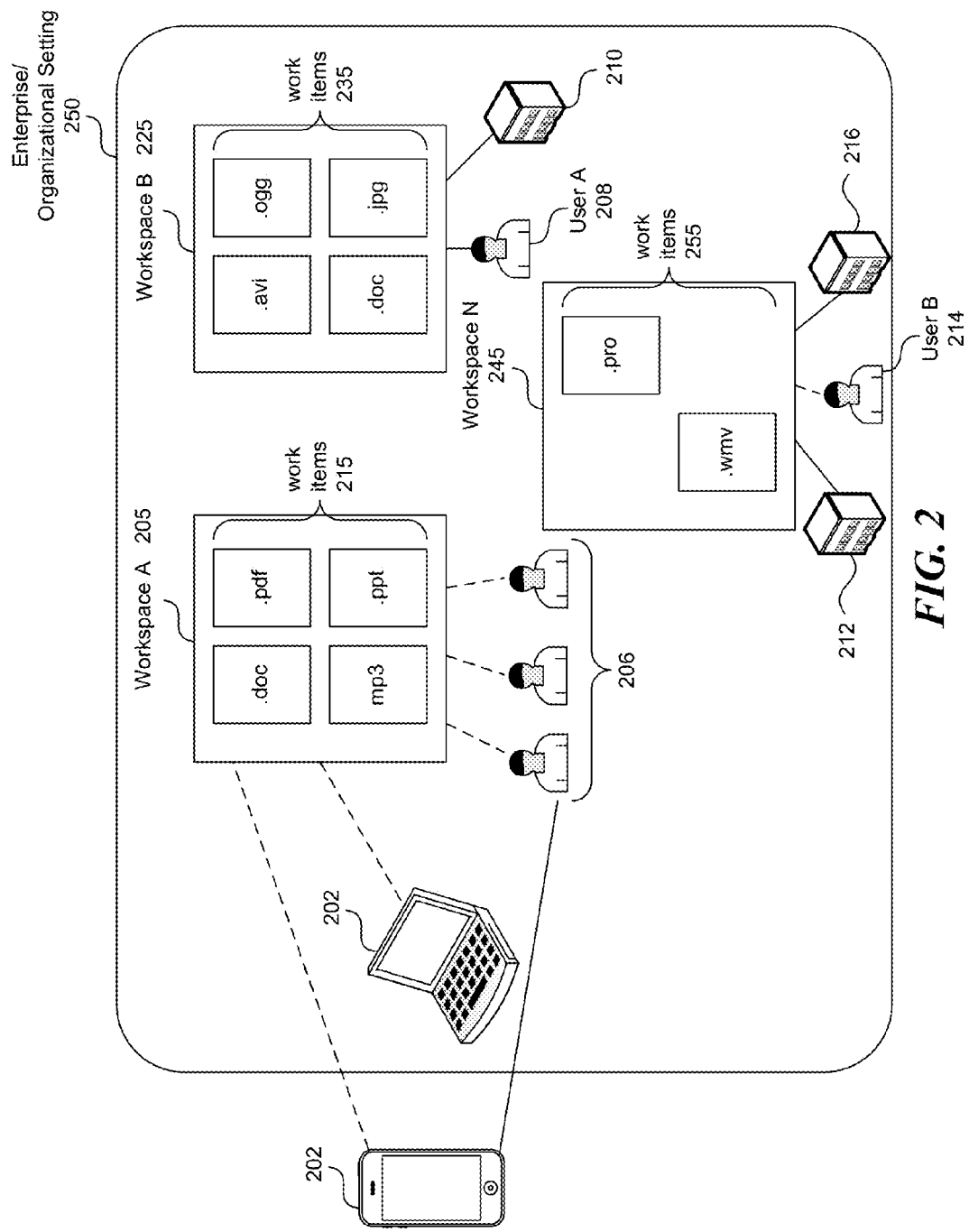
FIG. 2 depicts an example diagram of a web-based or online collaboration platform deployed in an enterprise or other organizational setting for organizing work items and workspaces.

A diagrammatic illustration of the cloud-based environment (e.g., collaboration environment) and the relationships between workspaces and users/collaborators are illustrated with further reference to the example of FIG. 2. A diagrammatic illustration of a workspace having multiple work items with which collaborators can access through multiple devices is illustrated with further reference to the example of FIG. 3.

Embodiments of the present disclosure relate to providing robustness and serviceability to a system that updates or informs remote clients 110-170 on user devices 102 based on events, actions, or changes (e.g., from user edits, updates, comments, etc.) that occurred in the cloud environment hosted by the host server 100.

In general, multiple users collaborate in the cloud-based environment hosted by server 100, and the user devices 102 of these users need to be appropriately updated such that the most current versions of data/content are synchronized with the relevant user devices and that notification of events are sent to the relevant devices/users in a timely and orderly fashion. Any given user can utilize any number and types of clients (e.g., sync client, real time web client, mobile sync client, mobile application, email client, server sync client, etc.) at any given time. Thus, the host server 100 described herein facilitates the orderly syncing or updating of the remote clients 110-170 which a given user/collaborator may use to access the cloud platform via any number of user devices 102.

For purposes of discussion herein, the term "replication" in context of a database (e.g., MySQL database) refers to duplicating data from an active server or system to a backup server for backup or redundancy during normal operations; the term "failover" or "switchover," used interchangeably herein, refers to switching to the redundant or backup server, system upon failure or abnormal termination of the previously active server or system.

The embodiments disclosed herein recognize that existing techniques that provide automatic replication and failover for repository redundancy lack the capability to ensure that all events in an action log can be properly received by every one of remote clients 110-170 in the system during a switchover or a failover from an active server to a backup server upon failure while providing zero or minimal down time during the switchover or failover. In particular, when an active (or master) server has recorded in an action log an action or an event that occurred, and the active server fails thereafter, thereby activating a standby (or slave) server, existing techniques can cause a remote client that reads the slave server to miss the event that occurred. The disclosed embodiments further recognize that this is mainly because a timestamp, which indicates when the event occurred (e.g., as recorded by the active server), may cause the event to record in the slave server as too old an event for a remote client to read. One technique to tackle this problem is to simply freeze or lock out any remote clients' reading activity to the action log during a failover so that the action log can be completely transferred to the slave server (which is becoming the new active server) before any client can read again from the new, switched-over action log. However, this technique sacrifices the availability of the entire distributed action log system because down time during the lock-out period of such technique is inevitable and undesirable.

Accordingly, embodiments of the present disclosure provide capabilities to ensure that no event in an action log is missed or skipped by any of remote clients in a distributed action log framework system during a switchover or a failover while requiring zero or minimal down time during the switchover or failover, thereby providing both robustness and serviceability to such system.

In accordance with some embodiments, an action log (or an action log table) includes not only a local timestamp for recording the occurrence of an event as logged by a local server (e.g., the active, master server), but also a plurality of remote timestamps, each remote timestamp indicates the time of the event's occurrence as logged by a remote server (e.g., the slave, standby server). Then, a dispatcher implementing the techniques disclosed herein is capable compare the local timestamp of the event with one or more remote timestamps of the event before the event is to be stored in a queue in a repository cluster (e.g., an HBase system) to be read by a remote client. In some embodiments, the dispatcher can selectively update the local timestamp of the event if the comparing indicates that the remote timestamp(s) is more recent than the local timestamp. In some additional or alternative embodiments, the dispatcher can generate a second event in the action log. The second event can include a second local timestamp that is updated based on a current time of the system. Further, the second event can have a same identifier as the first event.

More implementation details regarding the host server 100, the distributed data cluster 180, and various techniques in implementing repository redundancy are discussed below.

FIG. 2 depicts an example diagram of a web-based or online collaboration platform deployed in an enterprise or other organizational setting 250 for organizing work items 215, 235, 255 and workspaces 205, 225, 245.

The web-based platform for collaborating on projects or jointly working on documents can be used by individual users and shared among collaborators. In addition, the collaboration platform can be deployed in an organized setting including but not limited to, a company (e.g., an enterprise setting), a department in a company, an academic institution, a department in an academic institution, a class or course setting, or any other types of organizations or organized setting.

When deployed in an organizational setting, multiple workspaces (e.g., workspace A, B C) can be created to support different projects or a variety of work flows. Each workspace can have its own associate work items. For example, workspace A 205 can be associated with work items 215, workspace B 225 can be associated with work items 235, and workspace N can be associated with work items 255. The work items 215, 235, and 255 can be unique to each workspace but need not be. For example, a particular word document can be associated with only one workspace (e.g., workspace A 205) or it can be associated with multiple workspaces (e.g., Workspace A 205 and workspace B 225, etc.).

In general, each workspace has a set of users or collaborators associated with it. For example, workspace A 205 is associated with multiple users or collaborators 206. In some instances, workspaces deployed in an enterprise can be department specific. For example, workspace B can be associated with department 210 and some users shown as example user A 208 and workspace N 245 can be associated with departments 212 and 216 and users shown as example user B 214.

Each user associated with a workspace can generally access the work items associated with the workspace. The level of access depends on permissions associated with the specific workspace, and/or with a specific work item. Permissions can be set for the workspace or set individually on a per work item basis. For example, the creator of a workspace (e.g., one of user A 208 who creates workspace B) can set one permission setting applicable to all work items 235 for other associated users and/or users associated with the affiliate department 210, for example. Creator user A 208 can also set different permission settings for each work item, which can be the same for different users, or varying for different users.

In each workspace A, B . . . N, when an action is performed on a work item by a given user or any other activity is detected in the workspace, other users in the same workspace can be notified (e.g., in real time or in near real time, or not in real time). Activities which trigger real time notifications can include, by way of example but not limitation, adding, deleting, or modifying collaborators in the workspace, uploading, downloading, adding, deleting a work item in the workspace, creating a discussion topic in the workspace.

In some embodiments, items or content downloaded or edited can cause notifications to be generated. Such notifications can be sent to relevant users to notify them of actions surrounding a download, an edit, a change, a modification, a new file, a conflicting version, an upload of an edited or modified file.

In one embodiment, in a user interface to the web-based collaboration platform where notifications are presented, users can, via the same interface, create action items (e.g., tasks) and delegate the action items to other users including collaborators pertaining to a work item 215, for example. The collaborators 206 can be in the same workspace A 205 or the user can include a newly invited collaborator. Similarly, in the same user interface where discussion topics can be created in a workspace (e.g., workspace A, B or N, etc.), actionable events on work items can be created and/or delegated/assigned to other users such as collaborators of a given workspace 206 or other users. Through the same user interface, task status and updates from multiple users or collaborators can be indicated and reflected. In some instances, the users can perform the tasks (e.g., review or approve or reject, etc.) via the same user interface.

Figure 3:
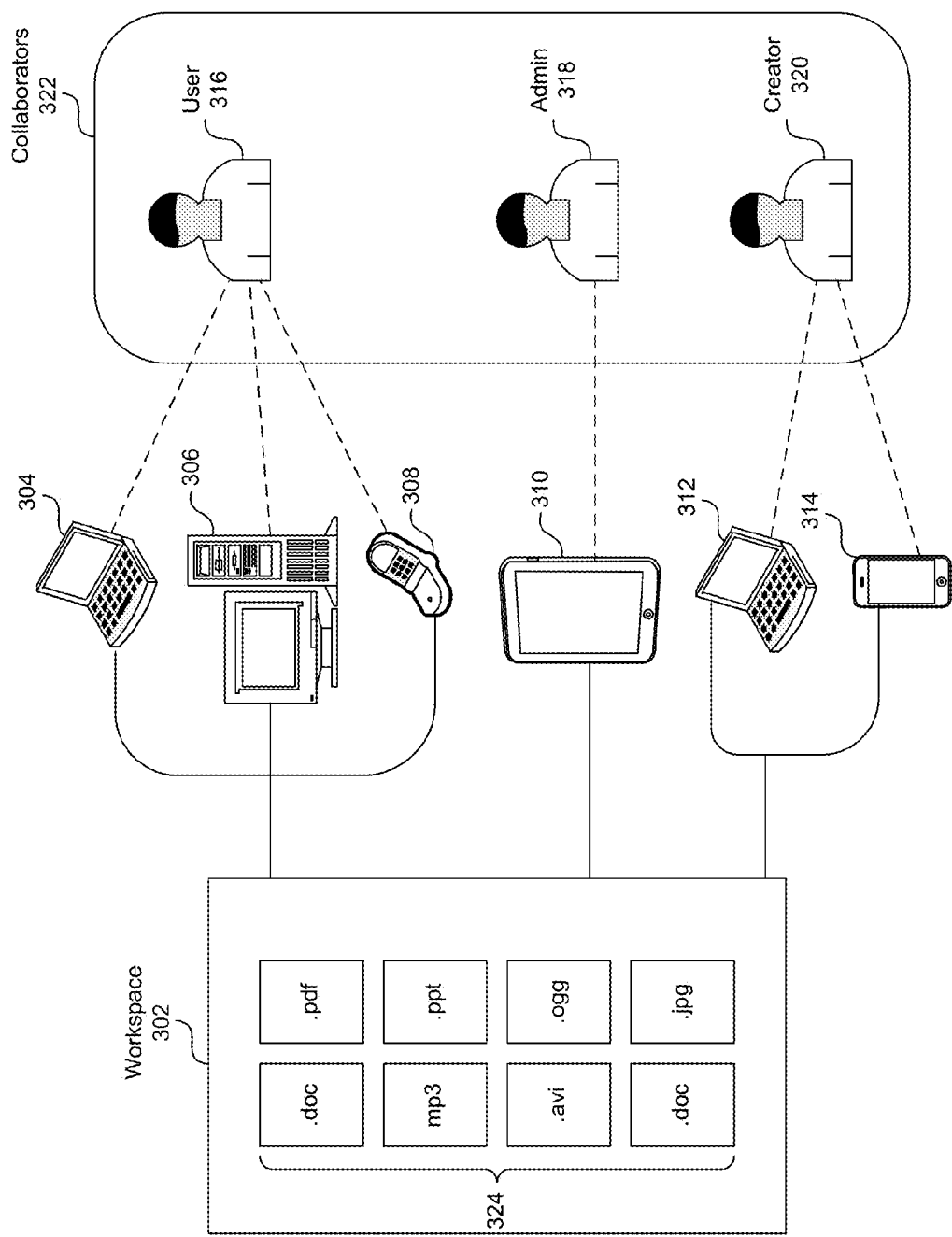
FIG. 3 depicts an example diagram of a workspace in a cloud-based platform such as an online or web-based collaboration environment accessible by multiple collaborators through various devices.

FIG. 3 depicts an example diagram of a workspace 302 in an online or web-based collaboration environment accessible by multiple collaborators 322 through various devices.

Each of users 316, 318, and 320 can individually use multiple different devices to access and/or manipulate work items 324 in the workspace 302 with which they are associated with. For example users 316, 318, 320 can be collaborators on a project to which work items 324 are relevant. Since the work items 324 are hosted by the collaboration environment (e.g., a cloud-based environment), each user can access the work items 324 anytime, and from any physical location using any device (e.g., including devices they own or any shared/public/loaner device).

Work items to be edited or viewed can be accessed from the workspace 302. Users can also be notified of access, edit, modification, and/or upload related-actions performed on work items 324 by other users or any other types of activities detected in the workspace 302. For example, if user 316 modifies a document, one or both of the other collaborators 318 and 320 can be notified of the modification in real time, or near real-time, or not in real time. The notifications can be sent through any of all of the devices associated with a given user, in various formats including, one or more of, email, SMS, or via a pop-up window in a user interface in which the user uses to access the collaboration platform. In the event of multiple notifications, each notification can be depicted preferentially (e.g., ordering in the user interface) based on user preferences and/or relevance to the user (e.g., implicit or explicit).

For example, a notification of a download, access, read, write, edit, or uploaded related activities can be presented in a feed stream among other notifications through a user interface on the user device according to relevancy to the user determined based on current or recent activity of the user in the web-based collaboration environment.

In one embodiment, the notification feed stream further enables users to create or generate actionable events (e.g., as task) which are or can be performed by other users 316 or collaborators 322 (e.g., including admin users or other users not in the same workspace), either in the same workspace 302 or in some other workspace. The actionable events such as tasks can also be assigned or delegated to other users via the same user interface.

For example, a given notification regarding a work item 324 can be associated with user interface features allowing a user 316 to assign a task related to the work item 324 (e.g., to another user 316, admin user 318, creator user 320 or another user). In one embodiment, a commenting user interface or a comment action associated with a notification can be used in conjunction with user interface features to enable task assignment, delegation, and/or management of the relevant work item or work items in the relevant workspaces, in the same user interface.

Figure 4A:
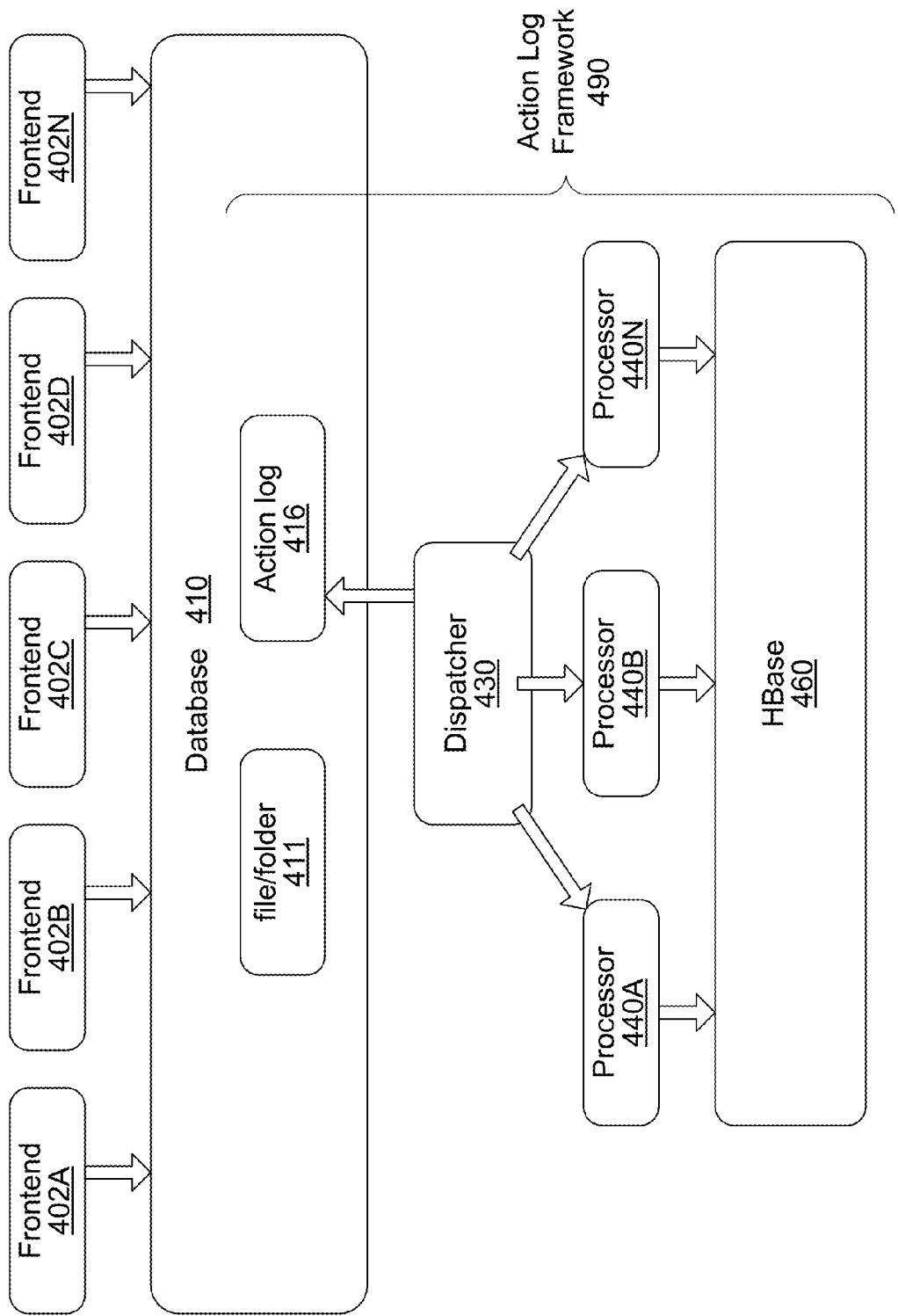
FIG. 4A depicts an example system block diagram showing the interaction between server-side components for incrementally updating a remote client with events or actions that occurred via a cloud-based platform.

FIG. 4A depicts an example system block diagram showing the interaction between server-side components for incrementally updating a remote client with events or actions that occurred via a cloud-based platform.

The server-side includes front end components 402A-N, a database 410, a dispatcher 430, one or more processors 440A-N, and a second database (e.g., HBase 460). The front end components 402A-N can interface with client devices/end user devices to detect/identify actions or transactions or events. The data or file change that occur as a result of the event is effectuated in the database 410 of the cloud-enabled platform (e.g., the relevant changes are made in the file table 411 of the database).

Depending on the type of action or event, an action log entry can be created and stored in the action log table or action log 416. In general, the front end 402 determines whether an action log entry is created from a given action or transaction. In general, an action log entry can be created for an action or event if certain durability requirements are to be met. The dispatcher 430 reads the action log entries from the action log 416 and sends them to the processors 440A-N where the fan-out, or collaborators to be notified of the event or to receive the file/data change as a result of the event is determined. Based on the computed fan-out or identified collaborators, the processors 440A-N writes the events/transactions to the relevant queues in the second database 460, from which remote clients can read.

It is noted also that the action log 416, the dispatcher 430, the processors 440A-N, the HBase 460, and one or more real time clients 470A-N (see FIG. 4B) are generally referred to as an "action log framework (ALF) 490." More specifically, HBase 460 is a primary data repository of the ALF 490. User actions initiated (e.g., via the webapp or the API) result in rows (or action log entries) being written to the action log 416 (or action log table 416). Then, in some embodiments, the action log entries are read from action log 416 by the ALF dispatcher 430, de-normalized into separate entries per user that needs to be notified of the action by an ALF processor (e.g., processor 440A), and written to the HBase 460. The HBase 460 is in turn read (e.g., via an API web service call) by real time clients 470A-N to notify a collaborator of the new change.

Figure 4B:
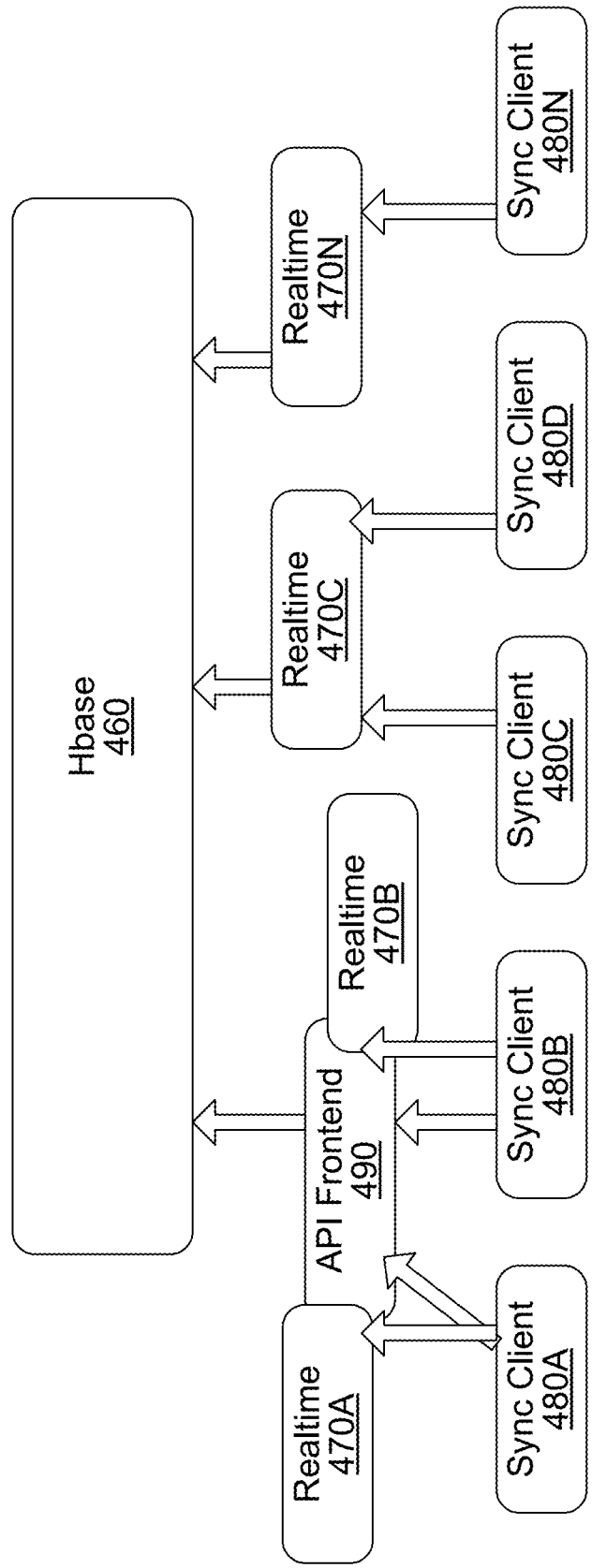
FIG. 4B depicts an example block diagram showing the interaction of remote clients and with a distributed database cluster for incremental updates of events/actions which occurred at a cloud-based environment.

FIG. 4B depicts an example block diagram showing the interaction of remote clients 470A-N and 480A-N with a distributed database cluster 460 for incremental updates of events/actions which occurred at a cloud-based environment. The remote clients can include, for example real time clients 470A-N (e.g., real-time web clients launched via a web browser, mobile application), and synchronization clients 480A-N (e.g., desktop sync, mobile sync, server sync, etc.) that users or collaborators use to interface/access the cloud-based platform including, but not limited to, a collaboration environment. Other types of clients may also read from the database cluster 460.

The queues in the database 460 (e.g., the distributed database cluster) are usually client type specific. For example, each queue is for a given client type for one given user. So, a user 'A' may have a sync client queue that all of the sync clients that user "A" uses reads from since user "A" may have multiple devices on which sync clients are installed. In general, the queues for clients in the database 460 are read only queues such that multiple clients can read from the same queue without making modifications. In this manner, if a user utilizes multiple sync clients, each client can still receive and detect the respective updates such that multiple devices can be synchronized. The remote clients also typically individually track the location in the queue from which they last read such that only the most recent events are updated at the client, and that the events read from a queue is specific to a given client, dependent on what has previously been synchronized or read.

In one embodiment, sync clients 480 connect to both real-time 470 and API front end 490 machines. The real time machines 470 can notify a sync client 480 when there has been an update in a user's account. The sync client 480 can then connect to API front end machine 490 to obtain the actual change/content. Alternatively, in some instances, the sync clients 480 can also obtain the changes/content/updates from the real time machines 470 simultaneous with the notification, or after being notified.

Now, with the above in mind, elements introduced in FIGS. 4A and 4B can be a part (e.g., a data center) of a larger, distributed system which, overall, incrementally updates remotes clients with events that occurred via a cloud-enabled platform. With reference to both FIGS. 4A and 4B, the operations of this larger system are now described at system-level to provide an architectural overview of the larger system. To enhance understanding, certain aspects are discussed from different component's perspective and therefore may be repetitive.

More specifically, HBase cluster (which comprises a local HBase cluster 460) can be scaled in its total data storage capacity and its capacity to service requests through the addition of data nodes, the "NameNode." The HBase comprises two complete, independent clusters (not shown in FIG. 4A for simplicity). The clusters are operated in master-slave replication mode. Each cluster includes a NameNode, a Secondary NameNode, and a set of homogenous data storage and data service nodes.

It is noted that, in some instances, the NameNode and Secondary NameNode may not be scaled horizontally, and are to be scaled vertically with additional memories as the volume of total data stores increases. However, the name nodes can be able to service a collection of a large amount of data (e.g., multiple petabytes) in their initial hardware configuration, and can be under only slightly increased load as request volume increases. According to some embodiments, each data node should be able to serve a minimum of >10,000 requests per second (RPS).

Write query volume is driven by all types of user activity on the web application or API. Writes are metered by the Action Log Dispatchers (e.g., ALF dispatcher 430), blunting spikes in user activity from reaching HBase. On the other hand, read query volume is driven primarily by synchronization client connections, and should be metered by controlling allowed connections to Realtime (e.g., realtime 470, FIG. 4B).

Notably, to enhance security, HBase is not directly exposed to any external parties. HBase does not support authentication or authorization, and any request that the network allows to reach the HBase cluster is not to be served. User authentication for read operations is provided by an API layer.

The ALF Dispatcher service (e.g., which comprises a local dispatcher 430) as a whole consists of multiple independent dispatcher daemons (e.g., dispatcher 430) running in each datacenter (e.g., which comprises the elements in FIGS. 4A and 4B), and the shared replication state captured in the "action_log" table of an Application Database (AppDB). The service reads entries representing user actions from AppDB and sends them in HTTP requests to the pools of ALF processor machines (e.g., processors 440A-N) located in each datacenter. Once an entry has been successfully processed and written to all HBase clusters across all datacenters, the dispatcher service deletes (e.g., as performed by a master dispatcher such as dispatcher 630(1), FIG. 6A) the original entry from AppDB's action_log table.

Each dispatcher maintains two database connections per a specific distributed portion of the AppDB (AppDB shard) that it is responsible for. One is to a read-only slave instance of the AppDB shard, which the dispatcher uses to poll the action_log table for entries. The second database connection is to the current active master instance for the AppDB shard, and the dispatcher uses this connection to update action_log rows with replication status, and to delete fully replicated rows.

Dispatchers also establish a set of transient HTTP connections to the ALF Processor pool in the local datacenter. Connections to the processors are distributed via a Proxy (e.g., an HAProxy) instance co-located on the same host as the dispatcher daemon. The dispatcher daemons periodically poll the database's action_log table, reading rows into RAM according to rules that depend on a particular dispatcher's role, either master or slave. The entries are bundled into batches, and sent to the ALF Processors as HTTP POST requests. The HTTP response from these requests indicates which entries were successfully processed, and a Queue Sequence Number (QSN) used to generate the HBase row key. The dispatchers record the QSN back to the action_log row in App DB.

It is noted that, like the name nodes mentioned above, in some instances, the ALF dispatcher cannot be scaled horizontally when associated with a single database instance, because it reads indiscriminately from the action_log table. Associating multiple dispatchers with a single database instance would require additional logic in the dispatcher to partition the rows fairly. However, for a set of database shards, the dispatcher can be scaled horizontally by partitioning responsibility for the database shards amongst multiple dispatchers. The number of dispatchers, ALF processors, and AppDB shards can be scaled independently of each other as demand requires.

If entries are occurring faster than the dispatcher and processors can handle them, then entries are to accumulate in the App DB action log table, and the stream of updates exposed via HBase is to be delayed. Inspecting the ALF processor response time via dispatcher metrics reveals whether the processors are capable of keeping up.

In some embodiments, data in HBase is backed up by writing the same data to multiple HBase clusters in multiple datacenters. ALF Dispatchers are deployed in matched sets, with each dispatcher responsible for writing to a single HBase cluster.

Each dispatcher writes to its local HBase cluster via sending entries to the local ALF Processor cluster. Each ALF Processor cluster receives entries only from its local ALF Dispatcher. Entries are propagated between datacenters exclusively via MySQL replication of the action_log table.

In normal operation, the dispatchers in exactly one datacenter operate in "master" mode. The master dispatchers read new entries from the action_log table and send them to the ALF processors, and record the QSN back to the action_log table. Only master dispatchers allocate new QSNs (e.g., by delegating the allocation process to the ALF processors.)

All other dispatchers operate in "slave" mode; they watch the action_log table for entries that have already been written by the master dispatchers, and for which an QSN is available. In some embodiments, slave dispatchers and their associated ALF processor pools do not allocate new QSNs; they only reuse QSNs allocated by the master dispatcher. The slave dispatchers send the entries to their local ALF processor pools, together with the QSN retrieved from AppDB. In this way, each HBase cluster contains a duplicate copy of each entry under identical row keys. The slave dispatchers also mark the entry in the action_log table as having been written.

The master dispatcher periodically deletes rows from the action_log table that have been fully replicated to all HBase clusters.

If the datacenter hosting a slave dispatcher needs to be taken entirely offline, no intervention is necessary. Rows awaiting replication are to accumulate in AppDB, and the slave dispatcher is to catch up once the datacenter is brought back online.

If the datacenter hosting the master dispatchers needs to be taken entirely offline, then the dispatchers in the other datacenter need to become the master dispatchers and the current master dispatchers need to become the slaves. This is done by performing an app_conf push where the value of master_hbase in the alf section of services.conf is switched to the other datacenter. Once the datacenter is back online, the dispatchers should run in slave mode so replications runs in the opposite direction.

It is noted that, if a true split brain occurs, where different master dispatchers have run, and allocated mismatching QSNs, the system heals itself once the normal configuration (dispatchers in one datacenter master, all others slave) is restored.

Within a datacenter, high availability can be achieved by allocating a pool of dispatchers for each logical dispatcher configured to operate in the datacenter. These pools use zookeeper leader-election to determine which node becomes active and which remain in standby mode.

ALF Dispatcher latency is primarily determined by the configured database polling interval, and the interval can be tuned to trade off reduced latency for increased AppDB load. An action log entry can be sent to an ALF processor and written to HBase in a short time (e.g., approximately 300 ms).

Realtime is a service to notify clients (e.g., web browser and synchronization client) that there was some change in a user's account (e.g., when a user has uploaded a file). The realtime interacts with the php webapp and with web browser and sync clients. A client gets a subscription URL through a regular web request or through the API and adds a QSN parameter to the end that it uses to longpoll with.

The QSN represents the latest event that a client has seen/processed. When a client subscribes to a realtime server, HBase is checked to see if there are any new events greater than the QSN passed in. If there are newer events, then a "new_change" message to the client indicating that it should do an API call to actually get the new events. If there are no newer events, then we keep the connection open for some interval before returning a "reconnect" to the user. Also, during the subscribe, we store a user_id→server address key, value pair in memcache. This is so we know what server a particular user is connected to.

The channel_id represents the user's subscribe endpoint and if there are any changes in the user's account, a message is pushed to that channel_id. When there is some event such as an upload on the web application, any relevant users is notified that a change has occurred. A calculation of the to_user_ids is performed, and then a lookup in memcache on each to_user_id can be performed to find what servers the users are connected to. Then a POST message is sent on each user's channel_id to each server.

The realtime service can scale linearly by adding more servers. In some embodiments, clients can long poll on a secure connection (e.g., via an SSL connection protocol).

Figure 5A:
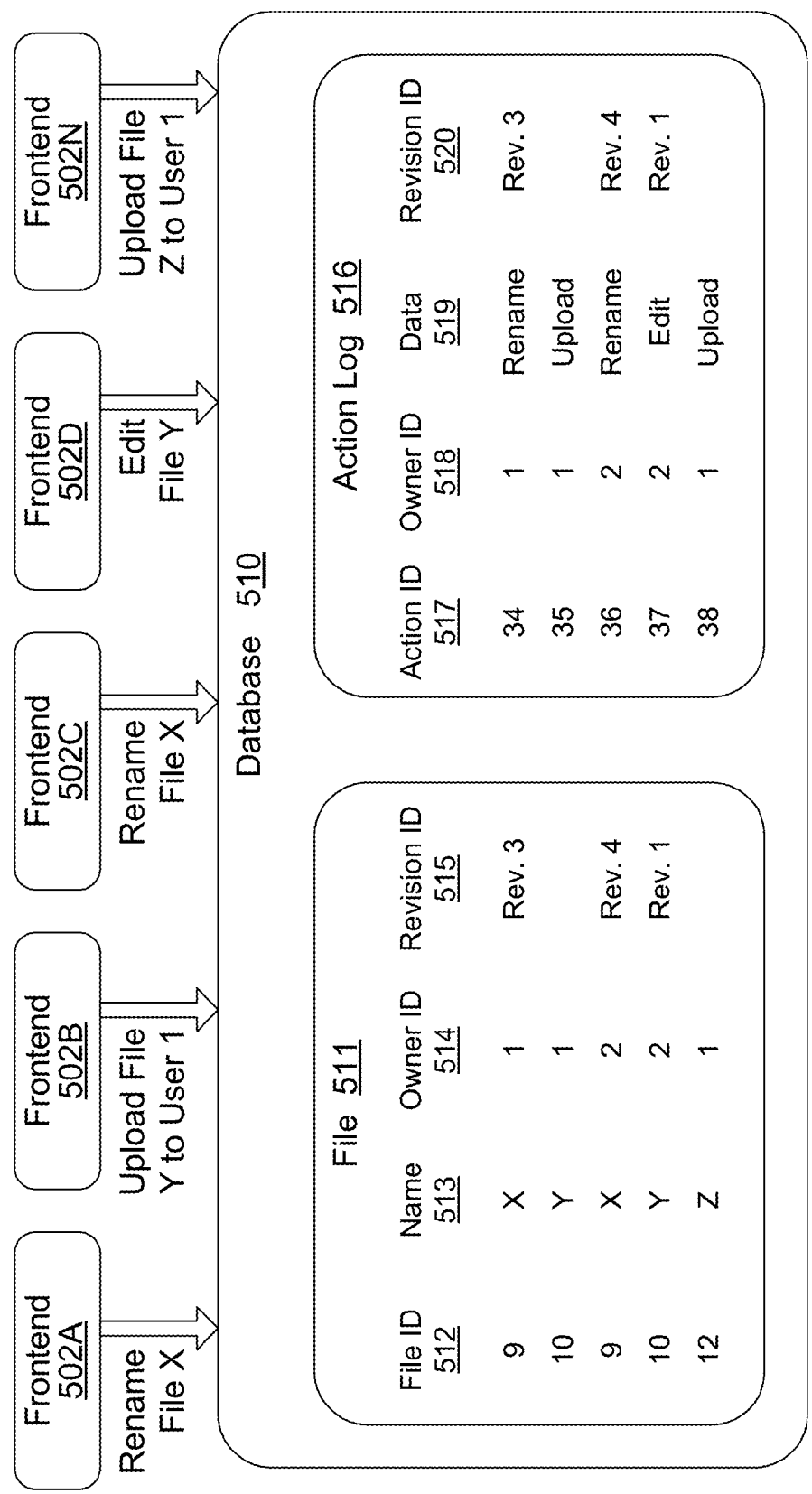
FIG. 5A depicts an example system block diagram showing action log entries recorded from actions/interactions on or with files/content stored in a database of a cloud-based environment.

FIG. 5A depicts an example system block diagram showing action log entries 516 recorded from actions/interactions on or with files/content 511 stored in a database 510 of a cloud-based environment.

The front ends 502A-N detect, identify, or receive the various actions or events on data or content performed by users or collaborators in a cloud-based environment. For example, events/actions can include by way of example but not limitation, file renames, file uploads/downloads, file edits, comments, etc. Based on the type of event, the front end 502 determines whether the action/event is to be created into a log entry to be stored in the action log 516. In creating a log entry, each action/event is recorded as a transaction with the file system change for asynchronous processing. In recording the transaction, the relevant file/folder row in the file 511 of the database 510 is inserted, updated, deleted, or otherwise modified according to the action. In one embodiment, the row is inserted in to the action log table 516 simultaneously with the write to the file 511 and also with the performance of action itself. Note that each entry includes an owner ID 514 in the file 511 and in the action log 516 to represent the owner of the item upon which an action occurred.

In one embodiment, action log entries are created in the same database 510 as the file table 511 such that file/content rollback can be performed if the file/data/content change results in an error or failure. As such, the action log entry creation in the action log table 516 can be created, in part, to meet durability (e.g., longevity) requirements of a given event/transaction (e.g., write events, or other edit events typically have higher durability requirements than a comment event, or a share event, etc.).

Action log entries can be created for select types of events or all events. For example, events/transactions such as file renames, file uploads may have higher durability requirements than a comment event, or a share event, in a sense that the changes from a file rename/file upload need to be maintained and updated at various respective clients for the relevant collaborators and the implication for missing a file rename or file upload is potentially more severe than missing a comment event or a share event, etc.

In general, action log entries are generally created for actions/events with higher durability requirements. Such a determination can be made by the front ends 502 as to whether a given event type is to be writing into the action log table 516. Action log entries may also be created for all events with durability requirements carried out downstream at event queues stored in the second database (e.g., the database 460 of FIG. 4B). Table 516 shows the action log entries created from the events stored in the file table 511.

The action log entries can be identified by the action ID 517. In addition, each action log entry can be associated with a user (e.g., owner) identifier 518, a data entry 519, and/or a revision identifier 520. The user identifier 518 can identify a user who is to a recipient as a result of an event (e.g., upload file to User 1). The owner identifier 518 represents the owner of the item upon which an action (e.g., represented by action ID 517) occurred and in general, each work item has no more than one owner. The data field 519 can identify the type of action/event (e.g., rename, upload, edit, comment, share, send, download, etc.).

The revision identifier 520 can indicate the version of any change made to a given file (e.g., edit, rename, upload, etc.). In one embodiment, the revision identifier 520 is derived from version tracking mechanisms (e.g., via revision ID 515) inherent to the database 510. The revision identifier 520 can used by remote clients to resolve conflicts in view of potentially conflicting events/transactions. For example, if a file is re-named twice and both events are synchronized/updated at a remote client, the client can use the rename event associated with the latest revision ID to make the necessary updates. This can ensure that the client is updated with the most current change regardless of when the events are read from the queue. Thus, even if the two rename events are writing to the queue for the client out of order, the client can still make the 'correct' update using the revision ID in case of conflicting changes.

Figure 5B:
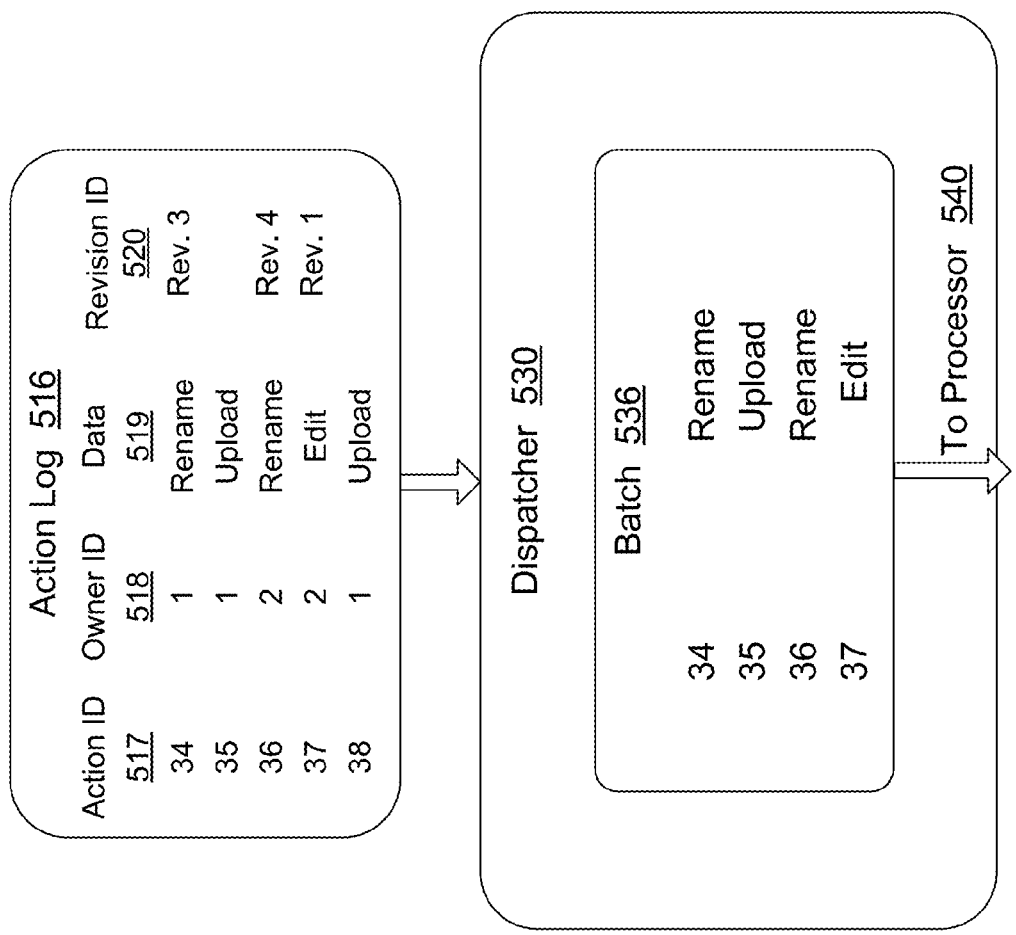
FIG. 5B depicts one example system block diagram showing action log entries in the action log table being batched processed in series by a dispatcher.

FIG. 5B depicts one example system block diagram showing action log entries in the action log table 516 being processed by a dispatcher 530. In one embodiment, the dispatcher 530 sends out the action log entries to the processor 540 in parallel. In this embodiment, the action log entries in the action log table 516 are batch written in order by the dispatcher 530 to processors 540. The batch 536 includes log entries for multiple recently occurred to be written to queues for multiple collaborators after processing by the processor 540, which determines the relevant collaborators, for each log entry. The number of actions in the batch can be dynamically determined based on system load and/or to optimize performance.

Figure 6A:
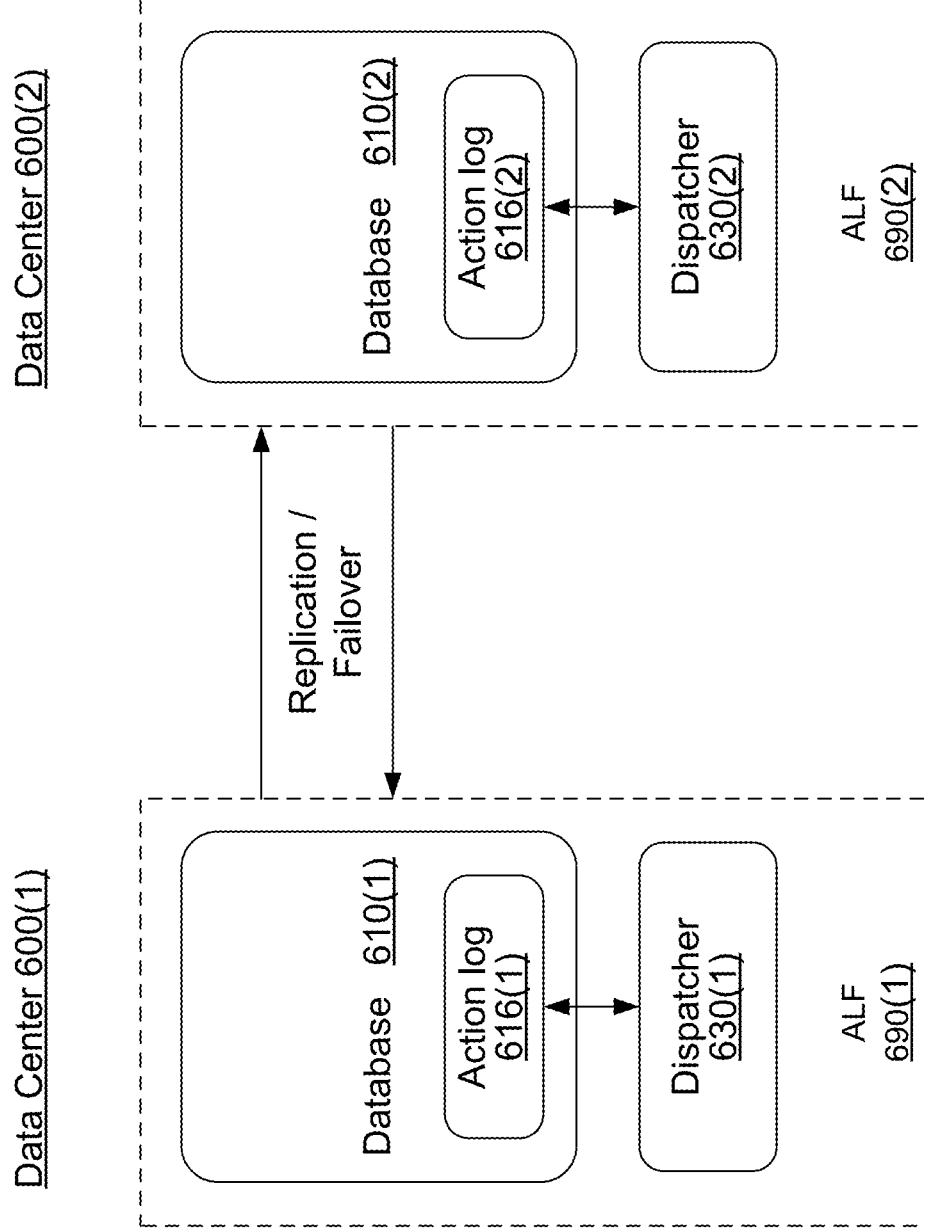
FIG. 6A depicts an example abbreviated architectural view of two data centers/clusters that perform replication operations under normal conditions and failover operations under anomalies in implementing repository redundancy.

FIG. 6A depicts an example abbreviated architectural view of two data centers/clusters 600(1) and 600(2) that perform replication operations under normal conditions and failover operations under anomalies in implementing repository redundancy. To facilitate a better understanding of the present disclosure, many components of the data centers 600(1) and 600(2) that are already discussed in FIG. 4A-5B are omitted in FIG. 6. For example, those processors and HBase structures that are coupled to the dispatchers in FIG. 4A are not depicted in FIG. 6 for simplicity. With reference to FIGS. 4A-4B, the present embodiments disclosed herein are discussed in fuller detail.

As previously mentioned, replication still provides a primary backup strategy. However, instead of the HBase's internal replication system known to a person having ordinary skill in the art, according to one or more embodiments herein, all data is written to both HBase clusters 460 at the application level by ALF Dispatcher 430. Some embodiments regularly backup and archive the name node metadata. This can be retrieved from the secondary name node of each cluster via an HTTP servlet.

For datacenter switchover operations, both HBase clusters 460 are online in both datacenters (e.g., DC 600(1) and DC 600(2)) at all times, either as the active master, or as a replication target (or a passive slave). Read requests against HBase 460 must be against the master to enforce data consistency. Changing a key (e.g., an "active_hbase" key) in a configuration can cause the read requests from web applications (e.g., accessing the cloud space via a web browser) & API (e.g., accessing the cloud space via software applications) to go the new target (i.e., the new active master as designated by the active_hbase key), and changes the roles of the ALF Dispatchers (e.g., from dispatcher 630(1) to dispatcher 630(2)) accordingly. Web application reads and dispatcher writes can be self-coordinated via a ZooKeeper Runbook.

With respect to the availability, the primary name node is a single point of failure for a single cluster. If a machine that hosts the primary name node becomes unreachable for any reason, all HBase 460's operations halt immediately. Further, either cluster (e.g., at Data Center 600(2)) can operate independently, without contacting the opposite datacenter (e.g., DC 600(1)). If the master cluster (e.g., DC 600(1)) loses connectivity to the slave cluster (e.g., DC 600(2)), it stores replication logs and apply them automatically when connectivity is restored.

Now, with the aforementioned in mind, existing techniques already provide limited replication capability of database (e.g., from database 610(1) to database 610(2)) to create redundancy for fault-tolerance. However, these existing techniques have undesirable drawbacks, and the techniques disclosed herein overcome these undesirable drawbacks and provide improvements on robustness and availability.

For simplicity, assume that in a distributed data cluster, there is only one active data center that acts as the master which handles reads of action log from remote clients. Then, when an active (or master) server has recorded, in an action log, an action or an event that occurred, and the active server fails thereafter, thereby activating a standby (or slave) server as the new master, the existing techniques can cause a remote client that reads the new master server to miss the event that occurred.

Take one example, assume from time 0, the data center 600(1) is the master server, and the data center 600(2) is the slave server. Assume that an event (e.g., a rename action) occurred at time 10 in the cloud-based environment, and therefore the event is recorded in the active action log 616(1) with a timestamp of 10. The replication mechanism causes the event entry (or action log entry) to be replicated in the standby action log 616(2). However, this replication takes time including, for example, the propagation delay from center 600(1) to center 600(2), processing time by the ALF 690(2) before the event gets actually logged in, etc. Assume that this delay is 9 units of time, so that the event is actually logged in the action log 616(2) by data center 600(2) at time 19 (but still with a timestamp of 10). Now, assume that the data center 600(1) fails at time 12, so that data center 600(2) becomes active after time 12. Then, a remote client's read request comes to data center 600(2) at time 15, then the remote client can miss the event with the timestamp of 10.

More specifically, the remote client periodically polls (e.g., via a real time client) the HBase with a queue sequence number (QSN) parameter to see if there is any new event greater than the QSN which had previously passed in. Effectively, the QSN represents the latest event that the remote client has seen/processed. If there are newer events, then a "new_change" message is returned to the client. The message indicates that the client should make a request (e.g., an API call) to get the actual new events (e.g., from an web application server). For purposes of discussion herein, it is sufficient to know that, for each remote client's poll, what is returned are those events that get logged in the action log with timestamps that are older than the time of the poll and within a "scan-back" window set by the database system. The scan-back window is a time period within which the database system guarantees the process can be completed. For example, if the scan-back window is 5 units of time, it means that the database can complete the recording (e.g., of an action log entry) within 5 units.

Therefore, assuming the scan-back window is 5 and continuing with the above example, when the remote client polls (e.g., via a read request) at time 15, which is essentially requesting the HBase (at Data Center 600(2)) to return whatever events that are logged in the action log 616(2) as having taken place between time 10-15, the event of time 10 would not be returned because it has not been logged into the action log 616(2) when the poll at time 15 took place. After the event gets logged at time 19, it is logged with a timestamp of 10, and therefore, when the client's next poll arrives at 20 which would only be asking for events logged as occurred between time 15-20, the returning result would not include the event in question, either.

In accordance with some embodiments, an action log (or an action log table) (e.g., action log 616) includes not only a local timestamp for recording the occurrence of an event as logged by a local server (e.g., the active, master server 600(1)), but also a plurality of remote timestamps, each remote timestamp indicates the time of the event's occurrence as logged by a remote server (e.g., the slave, standby server 600(2)). Then, a dispatcher (e.g., dispatcher 630) implementing the techniques disclosed herein is capable compare the local timestamp of the event with one or more remote timestamps of the event before the event is to be stored in a queue in a repository cluster (e.g., an HBase system) to be read by a remote client. In some embodiments, the dispatcher 630 can selectively update the local timestamp of the event if the comparing indicates that the remote timestamp(s) is more recent than the local timestamp. In some additional or alternative embodiments, the dispatcher 630 can generate a second event in the action log. The second event can include a second local timestamp that is updated based on a current time of the system. Further, the second event can have a same identifier as the first event.

In this way, an event that would have been missed can now be updated to "stay current" so as to allow the remote client to read it. It is noted that, in some embodiment, because the system is stateless, the sequence of the events need not be preserved while being capable of maintaining the correctness (e.g., by employing one or more techniques described above with respect to FIGS. 4A, 4B, and 5).

Figure 6B:
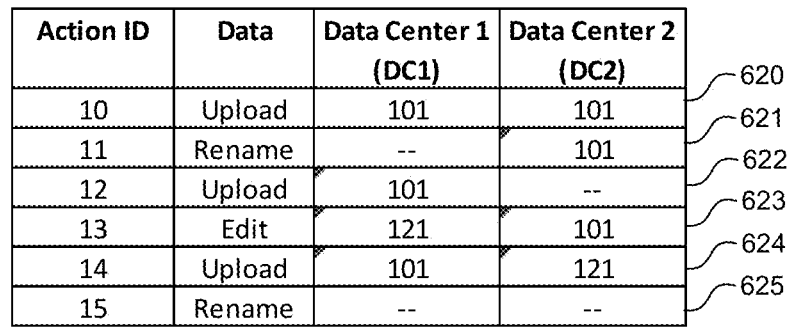
FIG. 6B-6D depict examples of action log entries which a dispatcher implementing repository redundancy can read from and/or perform actions to in accordance with some embodiments.
Figure 6C:
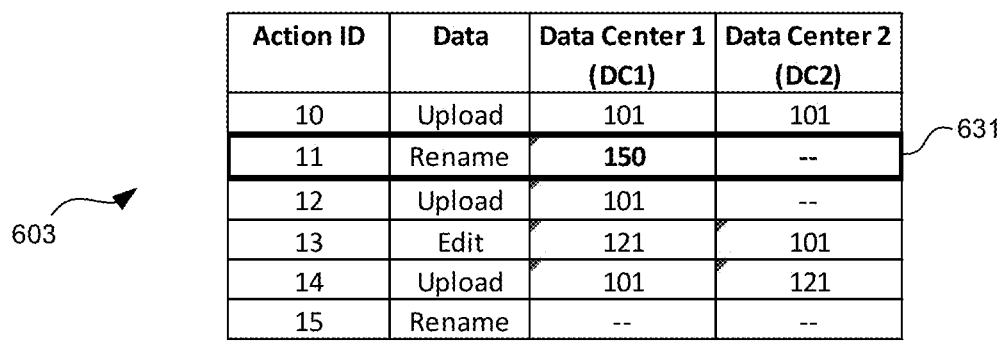
Figure 6D:
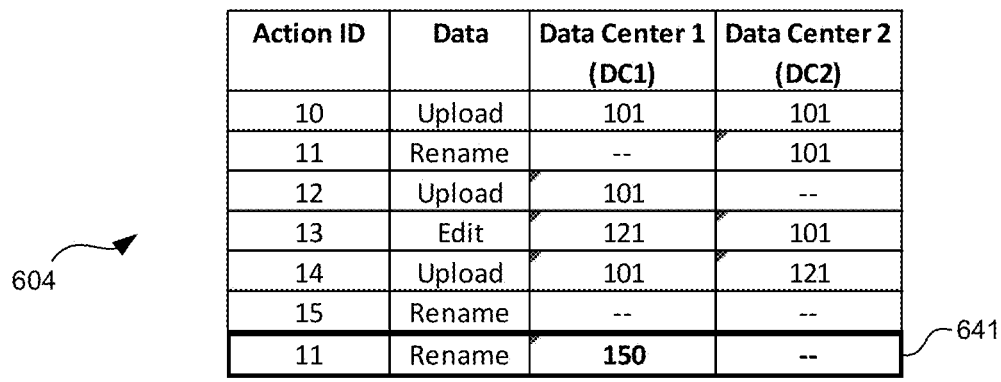

FIG. 6B-6D depict examples of action log entries which a dispatcher (e.g., dispatcher 630, FIG. 6A) implementing repository redundancy can read from and/or perform actions to in accordance with some embodiments. Action log entries 620-625 in action log table 602 respectively depict six different combination of scenarios which may be encountered by the dispatcher 630 during its operations. The action log entries 620-625 further include an identifier (Action ID) that uniquely identify their corresponding events.

For purposes of discussion herein, the terms "local" and "remote" are used in a relative sense; the local timestamp represents at what time the event occurred as recorded by the system, and wherein the remote timestamp represents at what time the event occurred as recorded by another system that is remote from the system. For the example as illustrated in FIGS. 6A-D, the dispatcher 630(1) is a local dispatcher to data center 600(1), and the dispatcher 630(2) is a remote dispatcher to data center 600(1). By the same token, data center 600(2) is a "remote system" to data center 600(1). Similarly, in action log table 602, timestamps under the column "Data Center 1 (DC1)" are "local timestamps" to the DC1's dispatcher (e.g., dispatcher 630(1)), but they are "remote timestamps" to the DC2's dispatcher (e.g., dispatcher 630(2)).

According to the present embodiments, the dispatcher 630 can compare a local timestamp of an event with a remote timestamp of the event, and can update the local timestamp of the event if the comparing indicates that the remote timestamp is more recent than the local timestamp. That is to say, the dispatcher 630 can update the local timestamp if it holds a value that represents older in time as compared to that represented by the remote timestamp so that the event can "stay current."

More specifically, the dispatcher 630 can react to each scenario depending on whether the dispatcher 630 is in an active (or master) mode or in a passive (or slave) mode. Assume that data center 1 (e.g., data center 600(1)) is active, and data center 2 (e.g., data center 600(2)) is passive. As such, the dispatcher 630(1) is an active dispatcher, and the dispatcher 630(2) is a passive dispatcher. Now, with reference to FIGS. 6A-6D, details of the techniques disclosed herein are further explained.

In action log entry 620: when the active dispatcher 630(1) determines that the local timestamp (i.e., under column DC1) of the event is equal to the remote timestamp (i.e., under column DC2) of the event, representing that the replication is completed without anomaly, the active dispatcher 630(1) dispatches the action log entry 620 (e.g., by sending it to one or more of the processors) and deletes the row from the action log 602 in manners described above regarding FIGS. 4A-4B.

When the passive dispatcher 630(2) determines that the local timestamp (i.e., under column DC2) of the event is not empty, the passive dispatcher 630(2) stays dormant.

In action log entry 621: when the active dispatcher 630(1) determines that the remote timestamp (i.e., under column DC2) of the event is more recent than the local timestamp (i.e., under column DC1) of the event (because the DC1 timestamp is empty, and the DC2 timestamp is recorded as time 101), the active dispatcher 630(1) updates the local timestamp of the event. An example of such update is illustrated in FIG. 6C as log entry 631, which is highlighted in bold. In the example log entry 631, the local timestamp is updated based on a current time (e.g., time 150) of the system. In the illustrated example, the updated local timestamp reflects the current time. In some other embodiments, the updated local timestamp can reflect some future time or some suitable time in light of the above-mentioned scan-back window. Additionally, the dispatcher 630(1) clears the remote timestamp after the updating, such as shown in the entry 631. That is to say, if the remote timestamp is not empty and is not equal to the local timestamp, the active dispatcher 630(1) clears the remote timestamp.

Alternatively, the active dispatcher 630(1) can generate a second event in the action log, such as illustrated in FIG. 6D as log entry 641, which is highlighted in bold. The second event 641 includes a second local timestamp that is updated based on a current time of the system in a similar manner described above with respect to FIG. 6C. Notably, the second event 641 has a same identifier (Action ID #11) as the first event (i.e., event 621) so that this second event 641, which is duplicative of the first event 621, can be properly processed without causing any erroneous behavior. Similar to event entry 631, the second event 641 includes a second remote timestamp (under column DC2) that is empty.

When the passive dispatcher 630(2) determines that the local timestamp (i.e., under column DC2) of the event is not empty, the passive dispatcher 630(2) stays dormant.

It is noted that, after processing, log entry 621 becomes in a similar state as log entry 622.

In action log entry 622: when the active dispatcher 630(1) determines that the local timestamp (i.e., under column DC1) of the event is more recent than the remote timestamp (i.e., under column DC2) of the event, the active dispatcher 630(1) stays dormant.

When the passive dispatcher 630(2) determines that that the local timestamp (i.e., under column DC2) of the event is empty, the passive dispatcher 630(2) copies the remote timestamp associated with the active, remote system into the local timestamp. In some embodiments, the copying is performed if (i) the local timestamp is empty, and if (ii) the remote timestamp associated with the active remote system is valid. The remote timestamp associated with the active remote system is valid if (i) it is the only timestamp that has a value, or if (ii) all remote timestamps are equal to each other. It is noted that the passive dispatcher 630(2), in the scenario as depicted in entry 622, performs the "replication" operations as described above.

For the example of log entry 622, when the passive dispatcher 630(2) determines that the local timestamp is empty, that the remote timestamp which corresponds to the active remote system (DC1) is valid (because it is the only timestamp in entry 622 that has a value), and that the active remote timestamp is 101, the passive dispatcher 630(2) copies the DC1 timestamp into the DC2 timestamp so that both read time 101.

In another example (not shown in FIG. 6B-6D for simplicity), assume there is a data center 3 (DC3) in addition to the DC1 and DC2. The DC1 is still active, and the DC2 and DC3 are passive. Further, at time 150, assuming that the dispatcher of DC3 determines that the active remote timestamp DC1 equals 100, that the passive remote timestamp DC2 equals 120, and that the local timestamp DC3 is empty, then the dispatcher of DC3 would stay dormant since the remote timestamp associated with the active remote system is currently invalid (because it is not the only timestamp that has a value, and not all remote timestamps are equal to each other), and the dispatcher of DC3 waits until the timestamp of DC1 is made equal to the timestamp of DC2, or if the timestamp of DC1 is the only value to copy from.

It is noted that, after processing, log entry 622 becomes in a similar state as log entry 620.

In action log entry 623: when the active dispatcher 630(1) determines that the local timestamp (i.e., under column DC1) of the event is more recent than the remote timestamp (i.e., under column DC2) of the event, because the DC1 timestamp (recorded as time 121) of the event is more recent than the DC2 timestamp (recorded as time 101) of the event, the active dispatcher 630(1) clears the old remote timestamp. That is to say, if the remote timestamp is not empty and is not equal to the local timestamp, the active dispatcher 630(1) clears the remote timestamp.

When the passive dispatcher 630(2) determines that the local timestamp (i.e., under column DC2) of the event is not empty, the passive dispatcher 630(2) stays dormant.

It is noted that, after processing, log entry 623 becomes in a similar state as log entry 622.

In action log entry 624: the operations of the dispatchers 630(1) and 630(2) are similar to those in the entry 621, because the DC2 timestamp (recorded as time 121) of the event is more recent than the DC1 timestamp (recorded as time 101) of the event.

So, when the active dispatcher 630(1) determines that the remote timestamp (i.e., under column DC2) of the event is more recent than the local timestamp (i.e., under column DC1) of the event, the active dispatcher 630(1) updates the local timestamp of the event. Additionally, the dispatcher 630(1) clears the remote timestamp after the updating. That is to say, if the remote timestamp is not empty and is not equal to the local timestamp, the active dispatcher 630(1) clears the remote timestamp. Alternatively, the active dispatcher 630(1) can generate a second event in the action log.

When the passive dispatcher 630(2) determines that the local timestamp (i.e., under column DC2) of the event is not empty, the passive dispatcher 630(2) stays dormant.

It is noted that, after processing, log entry 624 becomes in a similar state as log entry 622.

In action log entry 625: when the active dispatcher 630(1) determines that the local timestamp is empty, the active dispatcher 630(1) updates the local timestamp of the event in a manner that is described above.

When the passive dispatcher 630(2) determines that the local timestamp (i.e., under column DC2) of the event is empty, but that the remote timestamp (i.e., under column DC1) of the event that is associated with the active remote system (DC1) is invalid for not having a value, the passive dispatcher 630(2) stays dormant.

It is noted that, after processing, log entry 625 becomes in a similar state as log entry 622.

Overall, by dynamically providing the ability to a dispatcher 630 to selectively update or make current the action log entries, the disclosed techniques provide capabilities to ensure that no event in an action log is missed or skipped by any of remote clients in a distributed action log framework system during a switchover or a failover while requiring zero or minimal down time during the switchover or failover, thereby providing both robustness and serviceability to such system.

Figure 7A:
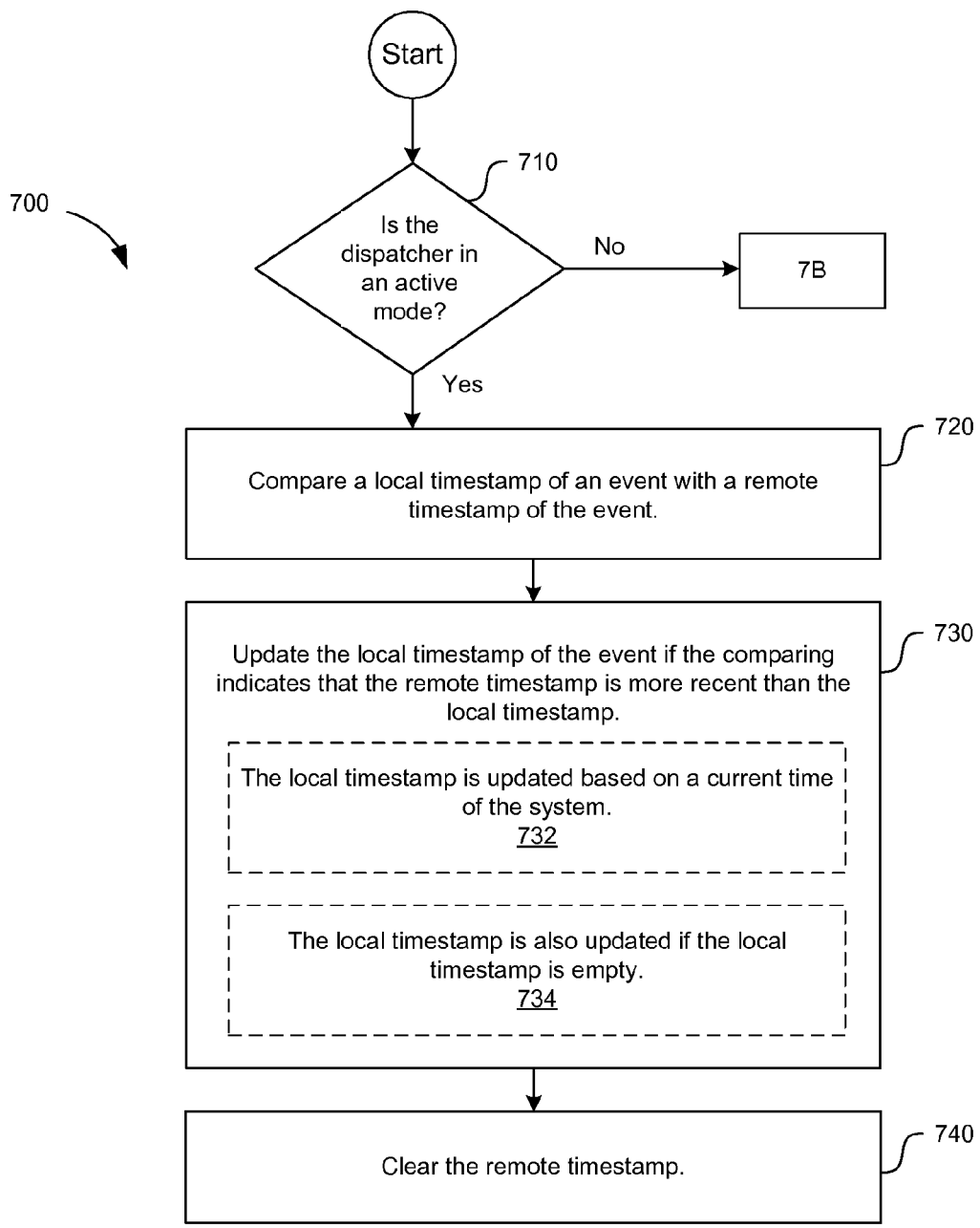
FIG. 7A depicts a flowchart illustrating an example process for a system that incrementally updates remote clients at devices with events that occurred via the platform to implement repository redundancy.

FIG. 7A depicts a flowchart illustrating an example process 700 for a system that incrementally updates remote clients at devices with events that occurred via the platform to implement repository redundancy. With reference to FIGS. 4A-6D, the process 700 is described.

In accordance with the embodiments disclosed herein, an action log (or an action log table) (e.g., action log 416, FIG. 4A; action log 516, FIG. 5A; action log 616, FIG. 6A; log 602, FIG. 6B) includes not only a local timestamp for recording the occurrence of an event as logged by a local server (e.g., the active, master server), but also a plurality of remote timestamps, each remote timestamp indicates the time of the event's occurrence as logged by a remote server (e.g., the slave, standby server).

First, a dispatcher (e.g., dispatcher 430, FIG. 4A; dispatcher 530, FIG. 5B; dispatcher 630, FIG. 6A) determines (710) if it is operating in an active (or master) mode or a passive (or slave) mode. If the dispatcher 430 is operating in the active mode (e.g., dispatcher 630(1)), then the dispatcher 630(1) compares a local timestamp of an event with a remote timestamp of the event.

Then, the dispatcher 630(1) updates (730) update the local timestamp of the event based on a result of the comparison. In one example, the dispatcher 630(1) updates (730) the local timestamp of the event if the comparing indicates that the remote timestamp is more recent than the local timestamp if the comparing indicates that the remote timestamp is more recent than the local timestamp. In some embodiments, the local timestamp is updated (732) based on a current time of the system. In some embodiments, the local timestamp is also updated (734) if the local timestamp is empty.

After the updating, some embodiments of the dispatcher 630(1) clear (740) the remote timestamp. The clearing can be made (i) after the updating, or (ii) if the local timestamp is more recent than the remote timestamp.

Figure 7B:
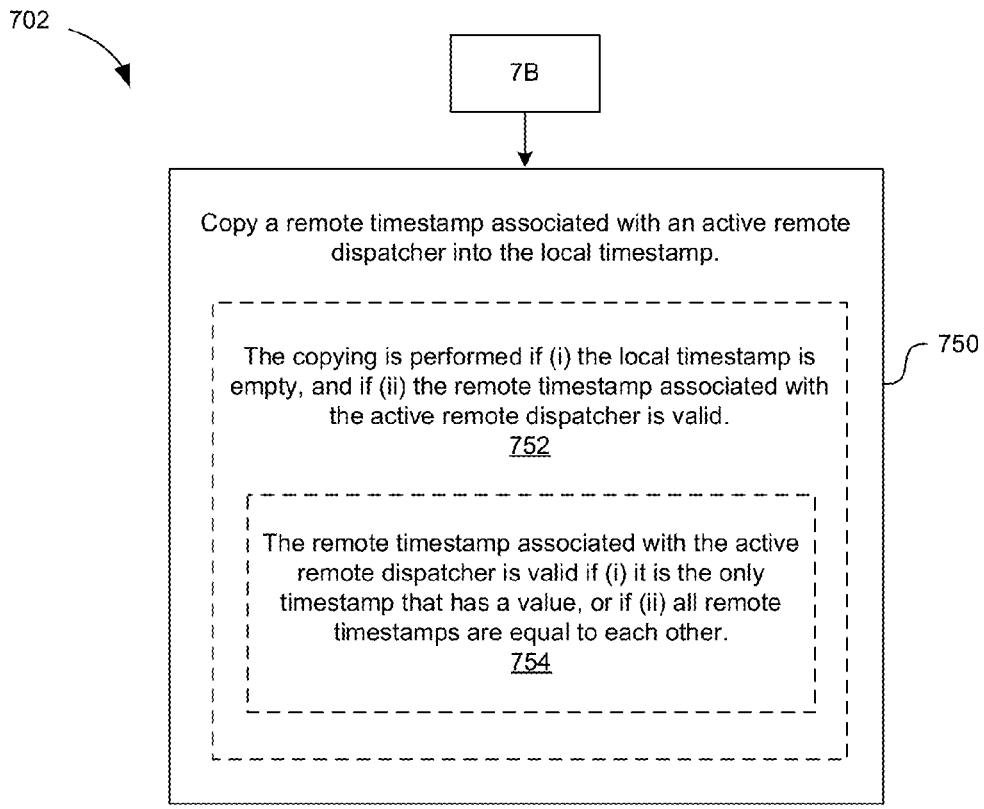
FIG. 7B depicts a flowchart illustrating further example details of the process of FIG. 7A.

FIG. 7B depicts a flowchart illustrating further example details of the process 700 of FIG. 7A. If the dispatcher 430 is operating in the active mode (e.g., dispatcher 630(2)), then the dispatcher 630(2) copies (750) a remote timestamp associated with an active remote dispatcher into the local timestamp. In some embodiments, the copying is performed (752) if (i) the local timestamp is empty, and if (ii) the remote timestamp associated with the active remote dispatcher is valid. In some embodiments, the remote timestamp associated with the active remote dispatcher is valid (754) if (i) it is the only timestamp that has a value, or if (ii) all remote timestamps are equal to each other.

Figure 8:
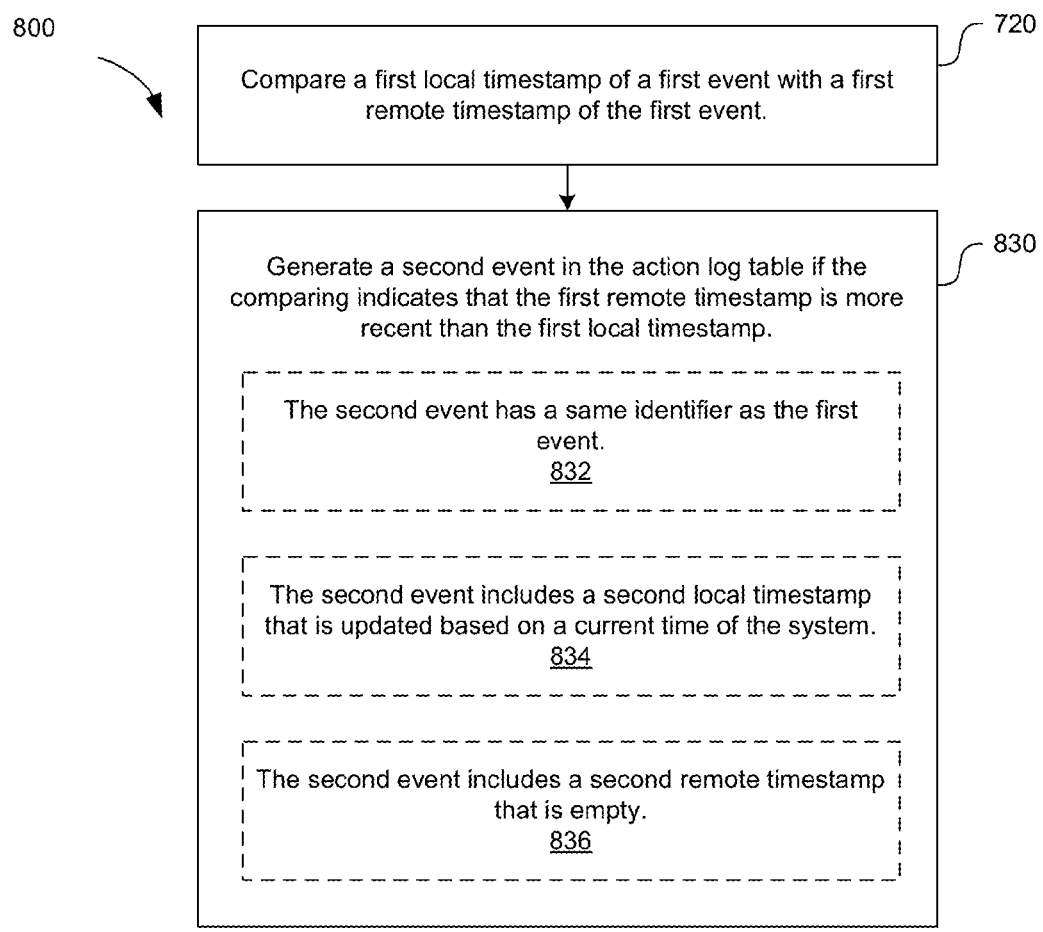
FIG. 8 depicts a flowchart illustrating another example process for a system that incrementally updates remote clients at devices with events that occurred via the platform to implement repository redundancy.

FIG. 8 depicts a flowchart illustrating another example process 800 for a system that incrementally updates remote clients at devices with events that occurred via the platform to implement repository redundancy In some alternative embodiments of dispatcher 630(1), after the dispatcher 630(1) completes the comparing step 720, the dispatcher 630(1) generates (830) a second event in the action log table based on the results of the comparison. In some examples, the dispatcher 630(1) generates (830) a second event in the action log table if the comparing indicates that the first remote timestamp is more recent than the first local timestamp. In some embodiments, the second event has (832) a same identifier as the first event. Further, some embodiments provide that the second event includes (834) a second local timestamp that is updated based on a current time of the system. Additionally, the second event can include (836) a second remote timestamp that is empty.

Figure 9:
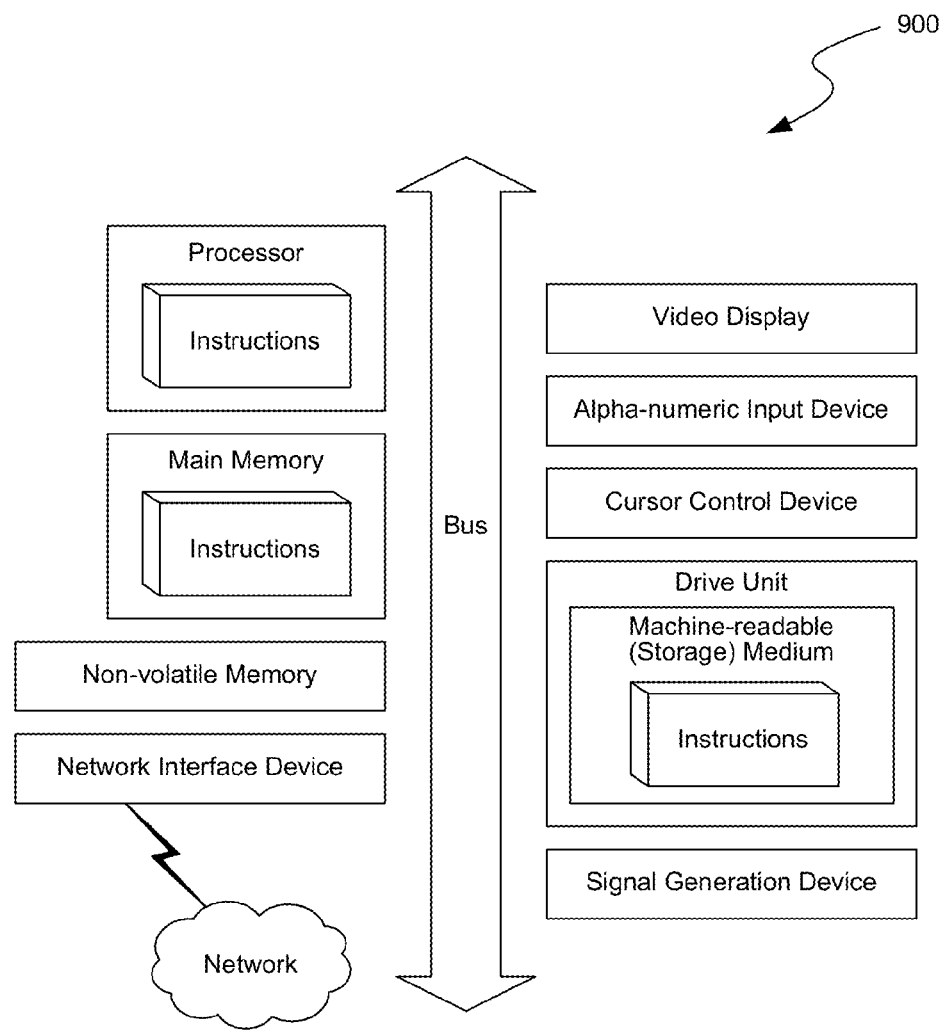
FIG. 9 depicts a diagrammatic representation of a machine in the example form of a computer system within which a set of instructions, for causing the machine to perform any one or more of the methodologies discussed herein, can be executed.

FIG. 9 shows a diagrammatic representation 900 of a machine in the example form of a computer system within which a set of instructions, for causing the machine to perform any one or more of the methodologies discussed herein, can be executed.

In alternative embodiments, the machine operates as a standalone device or can be connected (e.g., networked) to other machines. In a networked deployment, the machine can operate in the capacity of a server or a client machine in a client-server network environment, or as a peer machine in a peer-to-peer (or distributed) network environment.

The machine can be a server computer, a client computer, a personal computer (PC), a user device, a tablet, a phablet, a laptop computer, a set-top box (STB), a personal digital assistant (PDA), a thin-client device, a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, can be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device enables the machine 2800 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multi-layer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall can additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number can also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments can perform routines having steps, or employ systems having blocks, in a different order, and some processes or blocks can be deleted, moved, added, subdivided, combined, and/or modified to provide alternative or subcombinations. Each of these processes or blocks can be implemented in a variety of different ways. Also, while processes or blocks are at times shown as being performed in series, these processes or blocks can instead be performed in parallel, or can be performed at different times. Further, any specific numbers noted herein are only examples: alternative implementations can employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that can be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system can vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects can likewise be embodied as a means-plus-function claim, or in other forms, such as being embodied in a computer-readable medium. (Any claim intended to be treated under 35 U.S.C. §112, ā6 begins with the words "means for".) Accordingly, the applicant reserves the right to add additional claims after filing the application to pursue such additional claim forms for other aspects of the disclosure.

What is claimed is:

1. A system, comprising:
   an action log table for storing entries, each entry corresponding to one of a plurality of events, and each entry including an identifier, a local timestamp, and a remote timestamp for the one of the plurality of events, wherein the local timestamp indicates the occurrence of the event as logged by a local server and the remote timestamp indicates the occurrence of the same event as logged by a remote server, wherein the entries are written by one or more user applications of a cloud-based collaboration environment;
   a dispatcher coupled to the action log table to selectively issue the entries to a plurality of processor modules based on a type or an identity of a user associated with a respective processor module;
   a data repository coupled to the processor modules for storing the entries that are issued to the plurality of processor modules after processing in a queue to be read by a remote client of the cloud-based collaboration environment, wherein the data repository comprises a distributed database structure,
   wherein the dispatcher includes a controller to determine whether the entries are occurring faster than a speed at which the dispatcher and the plurality of processor modules can handle them based on a response time of the plurality of processor modules.

2. A method for repository redundancy in a system which incrementally updates remote clients with events that occurred in a cloud-enabled platform, each remote client being associated with a collaborator, the method comprising:
   before storing an event in a queue in a repository cluster to be read by a remote client, comparing a local timestamp of the event with a remote timestamp of the event;
   wherein the local timestamp indicates the occurrence of the event as logged by a local server and the remote timestamp indicates the occurrence of the same event as logged by a remote server; and
   updating the local timestamp of the event if the comparing indicates that the remote timestamp is more recent than the local timestamp.

3. The method of claim 2, wherein the local timestamp is updated based on a current time of the system.

4. The method of claim 2, wherein the local timestamp and the remote timestamp are stored as an action log entry that corresponds to the event, and wherein the action log entry further includes an identifier that uniquely identifies the event.

5. The method of claim 2, further comprising:
   clearing the remote timestamp (i) after the updating, or (ii) if the local timestamp is more recent than the remote timestamp.

6. The method of claim 2, further comprising:
   clearing the remote timestamp, if the remote timestamp is not empty and not equal to the local timestamp.

7. The method of claim 2, wherein the updating is also performed if the local timestamp is empty.

8. The method of claim 2, wherein the updating is performed when the system is operating in an active mode.

9. The method of claim 8, further comprising:
   when the system is operating in a passive mode, copying a remote timestamp associated with an active remote system into the local timestamp.

10. The method of claim 9, wherein the copying is performed if (i) the local timestamp is empty, and if (ii) the remote timestamp associated with the active remote system is valid.

11. The method of claim 10, wherein the remote timestamp associated with the active remote system is valid if (i) it is the only timestamp that has a value, or if (ii) all remote timestamps are equal to each other.

12. The method of claim 2, wherein the local timestamp represents at what time the event occurred as recorded by the system, and wherein the remote timestamp represents at what time the event occurred as recorded by another system that is remote from the system.

13. The method of claim 2, wherein the repository cluster is distributed.

14. The method of claim 2, wherein the queue is read by the remote client by using a query specific to a client type or a user's identity of the remote client.

15. The method of claim 14, wherein the client type includes an enterprise action log of the cloud-enabled collaboration platform.

16. The method of claim 2, wherein the repository cluster includes a relational database.

17. The method of claim 2, wherein the repository cluster includes non-relational databases.

18. The method of claim 2, wherein the repository cluster is write-optimized or optimized for sequential reads.

19. The method of claim 2, wherein the repository cluster comprises an HBase cluster.

20. The method of claim 2, wherein the event is written to the repository cluster as a part of a batch of recently occurred events to be written to queues for multiple collaborators.

21. A method for repository redundancy in a system which incrementally updates remote clients with events that occurred in a cloud-enabled platform, each remote client being associated with a collaborator, the method comprising:
   before storing a first event in a queue in a data repository to be read by a remote client, comparing a first local timestamp of the first event in an action log with a first remote timestamp of the first event;
   wherein the action log includes log entries in the data repository for the events that occurred in the cloud-enabled platform;
   wherein the first local timestamp indicates the occurrence of the first event as logged by a local server and the first remote timestamp indicates the occurrence of the same event as logged by a remote server; and
   if the comparing indicates that the first remote timestamp is more recent than the first local timestamp, generating a second event in the action log,
   wherein the second event includes a second local timestamp that is updated based on a current time of the system.

22. The method of claim 21, wherein the second event has a same identifier as the first event, and wherein the second local timestamp of the second event has a value that represents the current time of the system.

23. The method of claim 21, wherein the second event includes a second remote timestamp that is empty.

24. The method of claim 21, wherein the generating is also performed when the first local timestamp is empty.

25. The method of claim 21, wherein the generating is performed when the system is in an active mode.

26. The method of claim 25, further comprising:
when the system is in a passive mode, copying a remote timestamp associated with an active remote system into the first local timestamp.

27. The method of claim 26, wherein the copying is performed if (i) the first local timestamp is empty, and if (ii) the remote timestamp associated with the active remote system is valid.

28. The method of claim 27, wherein the remote timestamp associated with the active remote system is valid if (i) it is the only timestamp that has a value, or if (ii) all remote timestamps are equal to each other.

29. A system for incrementally updating remote clients with events that occurred in a cloud-based environment, the system comprising:
a processor; and
a memory coupled to the processor and storing a plurality of instructions which, when executed by the processor, cause the processor to:
process events from an action log, the action log having log entries in a data repository for the events that occurred in the cloud-based environment, each log entry including an identifier, a local timestamp, and a remote timestamp for an event;
before storing the event in a queue in a repository cluster to be read by a remote client, compare the local timestamp of the event with the remote timestamp of the event
wherein the local timestamp indicates the occurrence of the event as logged by the system, and wherein the remote timestamp indicates the occurrence of the same event as logged by a remote system; and
update the local timestamp of the event based on a current time of the system if the comparison indicates that the remote timestamp is more recent than the local timestamp.

30. The system of claim 29, wherein the processor is to perform the updating if the local timestamp is empty.

31. The system of claim 29, wherein the processor is to perform the updating if the local timestamp is empty.

32. The system of claim 29, wherein the processor is to perform the updating when the system is in an active mode.

33. The system of claim 32, wherein, when the system is in a passive mode, the processor is further caused to:
copy a remote timestamp associated with an active remote dispatcher into the local timestamp.

34. The system of claim 33, wherein the processor is to perform the copying if (i) the local timestamp is empty, and if (ii) the remote timestamp associated with the active remote system is valid.

35. The system of claim 34, wherein the remote timestamp associated with the active remote system is valid if (i) it is the only timestamp that has a value, or if (ii) all remote timestamps are equal to each other.

36. The system of claim 29, wherein the processor is further caused to:
clear the remote timestamp (i) after the update, or (ii) if the local timestamp is more recent than the remote timestamp.

37. The system of claim 29, wherein the processor is further caused to:
clear the remote timestamp, if the remote timestamp is not empty and not equal to the local timestamp.

38. A system for incrementally updating remote clients with events that occurred in a cloud-based environment, the system comprising:
a processor; and
a memory coupled to the processor and storing a plurality of instructions which, when executed by the processor, cause the processor to:
dispatch events from an action log, the action log having log entries in a data repository for the events that occurred in the cloud-based environment, each log entry including an identifier, a local timestamp, and a remote timestamp for an event;
wherein the local timestamp indicates the occurrence of the event as logged by the system and the remote timestamp indicates the occurrence of the same event as logged by a remote system;
when the system is operating in an active mode:
(i) before storing an event in a queue in a repository cluster to be read by a remote client, compare the local timestamp of the event with the remote timestamp of the event, and
(ii) update the local timestamp of the event based on a current time of the system if the comparison indicates that the remote timestamp is more recent than the local timestamp; and
when the system is operating in a passive mode:
(i) copy the remote timestamp into the local timestamp.

39. A system having a plurality of data centers for incrementally updating remote clients with events that occurred in a cloud-based environment, the system comprising:
a first data center having a first repository to store a plurality of log entries, wherein the log entries represent the events that occurred in the cloud-based environment, and wherein each log entry includes an identifier, a local timestamp, and a remote timestamps for an event;
a second data center having a second repository to store the plurality of events;
wherein the local timestamp indicates the occurrence of the event as logged by first data center and the remote timestamp indicates the occurrence of the same event as logged by the second data center; and
a control module coupled to the data centers to select one data center to act as an active data center upon detecting failure of one or more of the data centers;
wherein the first data center, when operating as the active center, is to:
(i) before storing the event in a queue in a repository cluster to be read by a remote client, compare the local timestamp of the event with the remote timestamp of the event, and
(ii) update the local timestamp of the event based on a current time of the first data center if the comparison indicates that the remote timestamp is more recent than the local timestamp; and
wherein the first data center, when operating as a passive center, is to:
(i) copy the remote timestamp into the local timestamp.

40. The system of claim 39, further comprising
a third data center having a third repository to store the plurality of events, wherein the third data center operates as another passive center.

41. A non-transitory machine-readable medium having stored thereon instructions which, when executed by a processor, causes the processor to:
before storing an event in a queue in a repository cluster to be read by a remote client, compare a local timestamp of the event with a remote timestamp of the event;
wherein the local timestamp indicates the occurrence of the event as logged by a local server and the remote timestamp indicates the occurrence of the same event as logged by a remote sewer; and update the local timestamp of the event if the comparing indicates that the remote timestamp is more recent than the local timestamp.

42. The medium of claim 41, wherein the local timestamp is updated based on a current time of a system that comprises the processor.

* * * * *